(12) United States Patent
Fang et al.

(10) Patent No.: US 12,158,275 B2
(45) Date of Patent: Dec. 3, 2024

(54) HOT WATER SUPPLY APPARATUS

(71) Applicant: DAIKIN INDUSTRIES, LTD., Osaka (JP)

(72) Inventors: Qi Fang, Osaka (JP); Masakazu Okamoto, Osaka (JP); Atsushi Okamoto, Osaka (JP); Yasuhiro Kouno, Osaka (JP); Yurika Gotou, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 18 days.

(21) Appl. No.: 17/481,096

(22) Filed: Sep. 21, 2021

(65) Prior Publication Data

US 2022/0003456 A1    Jan. 6, 2022

Related U.S. Application Data

(63) Continuation of application No. PCT/JP2020/013417, filed on Mar. 25, 2020.

(30) Foreign Application Priority Data

Mar. 27, 2019    (JP) .................................. 2019-059978

(51) Int. Cl.
  *F24D 19/10*    (2006.01)
  *F24H 4/04*    (2006.01)

(52) U.S. Cl.
  CPC ............ *F24D 19/1054* (2013.01); *F24H 4/04* (2013.01)

(58) Field of Classification Search
  None
  See application file for complete search history.

(56) References Cited

U.S. PATENT DOCUMENTS

2017/0023263 A1*    1/2017    Tamaki .................... F24D 3/08

FOREIGN PATENT DOCUMENTS

| CN | 106415136 A | 2/2017 |
|---|---|---|
| EP | 2 249 098 A1 | 11/2010 |
| EP | 3 163 176 A1 | 5/2017 |
| EP | 3 404 339 A1 | 11/2018 |
| JP | 2004263954 A * | 9/2004 |
| JP | 2004-286307 A | 10/2004 |
| JP | 2006-162178 A | 6/2006 |

(Continued)

OTHER PUBLICATIONS

JP-2012093011-A English translation (Year: 2012).*

(Continued)

*Primary Examiner* — Steven S Anderson, II
*Assistant Examiner* — Kurt J Wolford
(74) *Attorney, Agent, or Firm* — Global IP Counselors, LLP

(57) ABSTRACT

A hot water supply apparatus includes a hot water supply channel. The hot water supply channel includes a heating section configured to heat water and a tank configured to store the water heated by the heating section. The hot water supply channel is configured to execute a first hot water supply operation in a hot water storage state in which a low-temperature layer, a medium-temperature layer, and a high-temperature layer are formed in the tank. The first hot water supply operation includes heating water in the medium-temperature layer to a first temperature by the heating section and supplying the water heated to a hot water supply target.

14 Claims, 11 Drawing Sheets

(56) References Cited

FOREIGN PATENT DOCUMENTS

| | | |
|---|---|---|
| JP | 3925433 B2 | 3/2007 |
| JP | 2007-113836 A | 5/2007 |
| JP | 2007-278553 A | 10/2007 |
| JP | 2012-77930 A | 4/2012 |
| JP | 2012-93011 A | 5/2012 |
| JP | 2012093011 A * | 5/2012 |
| WO | 2016/001980 A1 | 1/2016 |

OTHER PUBLICATIONS

JP-2004263954-A English translation (Year: 2004).*
International Search Report of corresponding PCT Application No. PCT/JP2020/013417 dated Jun. 23, 2020.
International Preliminary Report of corresponding PCT Application No. PCT/JP2020/013417 dated Oct. 7, 2021.
European Search Report of corresponding EP Application No. 20 77 6650.2 dated Mar. 24, 2022.

* cited by examiner

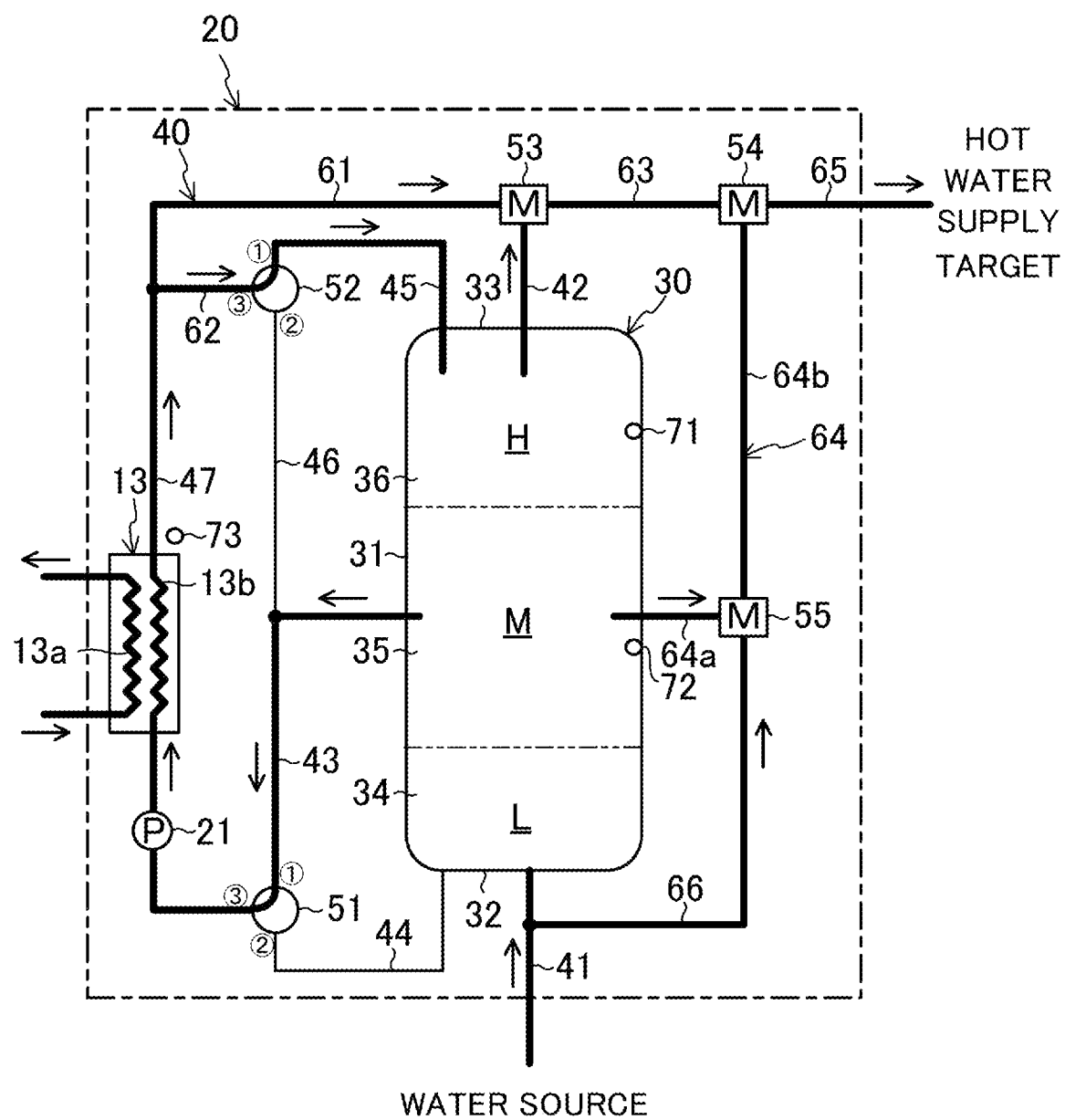

HOT WATER SUPPLY APPARATUS

CROSS-REFERENCE TO RELATED APPLICATIONS

This is a continuation of International Application No. PCT/JP2020/013417 filed on Mar. 25, 2020, which claims priority to Japanese Patent Application No. 2019-059978, filed on Mar. 27, 2019. The entire disclosures of these applications are incorporated by reference herein.

BACKGROUND

Field of Invention

The present disclosure relates to a hot water supply apparatus.

Background Information

A hot water supply apparatus of Japanese Patent No. 3925433 includes a heat exchanger (a heating section), and a tank that stores water heated by the heat exchanger. Japanese Patent No. 3925433 describes a hot water supply channel through which, after water in a lower portion of the tank has been heated by the heat exchanger, the heated water is supplied to a predetermined hot water supply target (such as a bath or a shower).

SUMMARY

A first aspect is directed to a hot water supply apparatus including a hot water supply channel. The hot water supply channel includes a heating section configured to heat water and a tank configured to store the water heated by the heating section. The hot water supply channel is configured to execute a first hot water supply operation in a hot water storage state in which a low-temperature layer, a medium-temperature layer, and a high-temperature layer are formed in the tank. The first hot water supply operation includes heating water in the medium-temperature layer to a first temperature by the heating section and supplying the water heated to a hot water supply target.

BRIEF DESCRIPTION OF THE DRAWINGS

FIG. 12 is a schematic piping system diagram of a hot water supply apparatus according to the variation, and illustrates a first hot water supply operation.

DETAILED DESCRIPTION OF EMBODIMENT(S)

An embodiment of the present disclosure will be described below with reference to the drawings. The embodiment below is merely an exemplary one in nature, and is not intended to limit the scope, applications, or use of the invention.

Embodiment

A hot water supply apparatus (20) of the present disclosure is used for a heat pump hot water supply unit (1). The hot water supply unit (1) heats water supplied from a water source, and stores the heated water in a tank (30). The heated water in the tank (30) is supplied to a hot water supply target (T). The water source (S) is a line through which water is supplied, and includes a water supply system. The hot water supply target (T) is a target where the heated water is used, and includes a shower, a faucet, and a bathtub.

Figure 1:
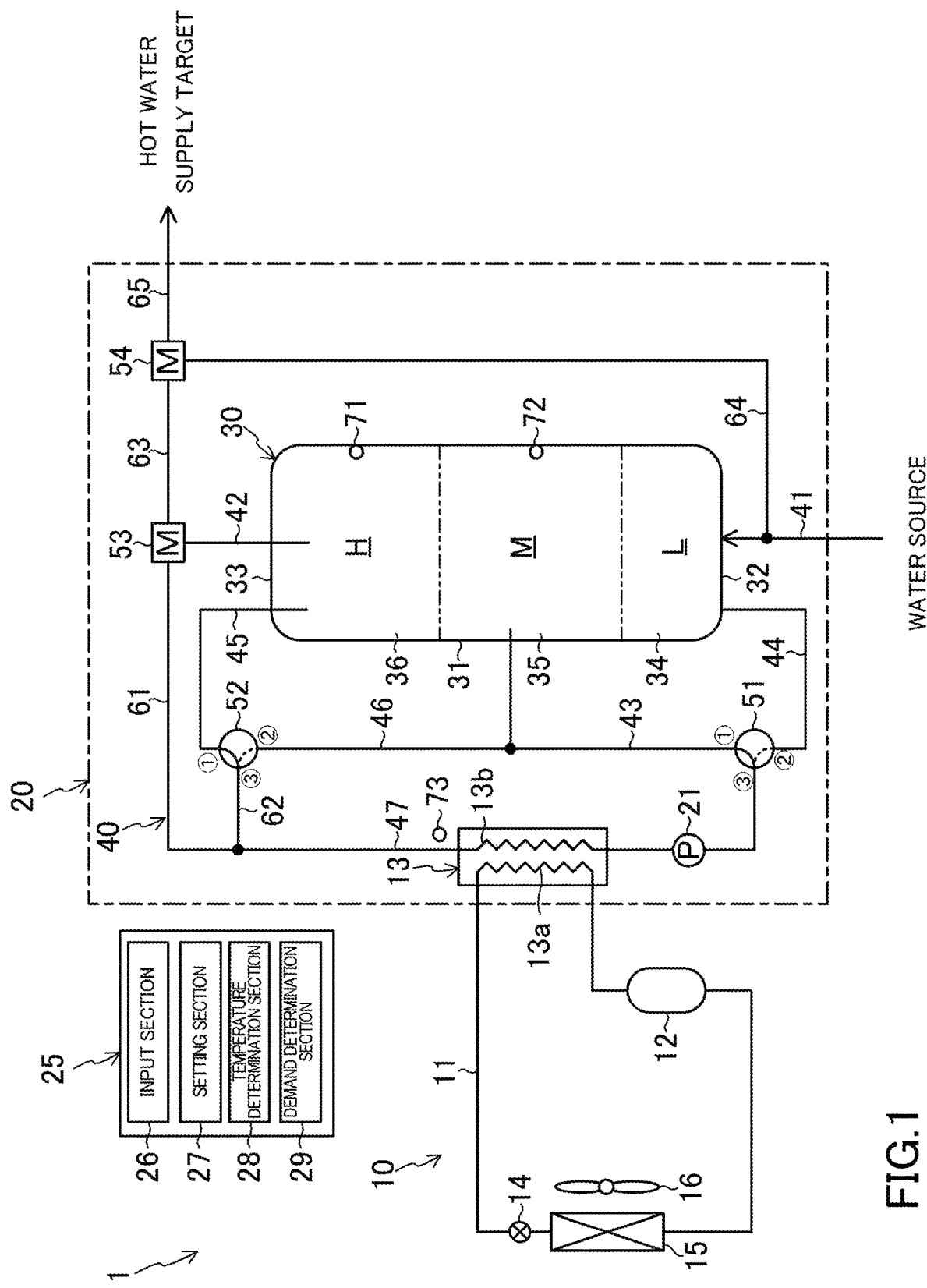
FIG. 1 is a piping system diagram illustrating an overall configuration of a hot water supply unit according to an embodiment.

As illustrated in FIG. 1, the hot water supply unit (1) includes a heat source apparatus (10), the hot water supply apparatus (20), and a controller (25). The heat source apparatus (10) includes a refrigerant circuit (11). The hot water supply apparatus (20) has a hot water supply channel (40). The hot water supply channel (40) is a water channel formed between the water source (S) and the hot water supply target (T). The hot water supply channel (40) is a water channel throughout the hot water supply apparatus (20). The hot water supply unit (1) includes a water heat exchanger (13). The refrigerant circuit (11) and the hot water supply channel (40) are connected to each other via the water heat exchanger (13). The water heat exchanger (13) is shared by the heat source apparatus (10) and the hot water supply apparatus (20).

Heat Source Apparatus

The heat source apparatus (10) is a heat source for producing heated water. The refrigerant circuit (11) of the heat source apparatus (10) is filled with a refrigerant. Examples of the refrigerant to be used include a fluorocarbon refrigerant and a natural refrigerant, such as propane. The refrigerant circulates in the refrigerant circuit (11), thereby performing a vapor compression refrigeration cycle. Strictly, the refrigerant circuit (11) undergoes a so-called subcritical cycle in which the pressure of the high-pressure refrigerant is lower than the critical pressure.

The refrigerant circuit (11) includes a compressor (12), the water heat exchanger (13), an expansion valve (14), and an air heat exchanger (15).

The compressor (12) sucks the low-pressure refrigerant, and compresses the sucked low-pressure refrigerant. The compressor (12) discharges the refrigerant compressed to high pressure.

The water heat exchanger (13) constitutes a heating section that heats water in the hot water supply channel (40). The water heat exchanger (13) has a refrigerant channel (13a) and a water channel (13b). The water heat exchanger (13) enables heat exchange between the refrigerant flowing through the refrigerant channel (13a) and the water flowing through the water channel (13b). The water heat exchanger (13) constitutes a radiator (condenser) that allows the refrigerant to dissipate heat.

The expansion valve (14) constitutes a decompression mechanism that decompresses the refrigerant. The expansion valve (14) decompresses the high-pressure refrigerant to low-pressure refrigerant. The expansion valve (14) is configured as an electronic expansion valve, for example.

The air heat exchanger (15) enables heat exchange between air and the refrigerant. The air heat exchanger (15) is placed outside a room. An outdoor fan (16) is installed near the air heat exchanger (15). The air transferred by the outdoor fan (16) passes through the air heat exchanger (15). In the air heat exchanger (15), the refrigerant absorbs heat from outdoor air and evaporates. The air heat exchanger (15) constitutes an evaporator.

Hot Water Supply Apparatus

The hot water supply apparatus (20) has the hot water supply channel (40). The hot water supply channel (40) includes the water heat exchanger (13), the tank (30), and a pump (21).

Water Heat Exchanger

The water channel (13b) of the water heat exchanger (13) is connected to the hot water supply channel (40). In the water heat exchanger (13), water is heated by the refrigerant dissipating heat.

Tank

The tank (30) is a hollow container. The tank (30) is formed in the shape of a vertically long cylinder. The tank (30) has a cylindrical barrel (31), a bottom portion (32) closing a lower end of the barrel (31), and a top portion (33) closing an upper end of the barrel (31). A storage portion for storing water is formed in the tank (30). Specifically, a lower storage portion (34), an intermediate storage portion (35), and an upper storage portion (36) arranged sequentially from the bottom portion (32) toward the top portion (33) are formed in the tank (30). The upper storage portion (36) is a first storage portion located in an upper portion of the tank (30). The lower storage portion (34) is a second storage portion located in a lower portion of the tank (30). The intermediate storage portion (35) is located between the lower storage portion (34) and the upper storage portion (36).

Figure 3:
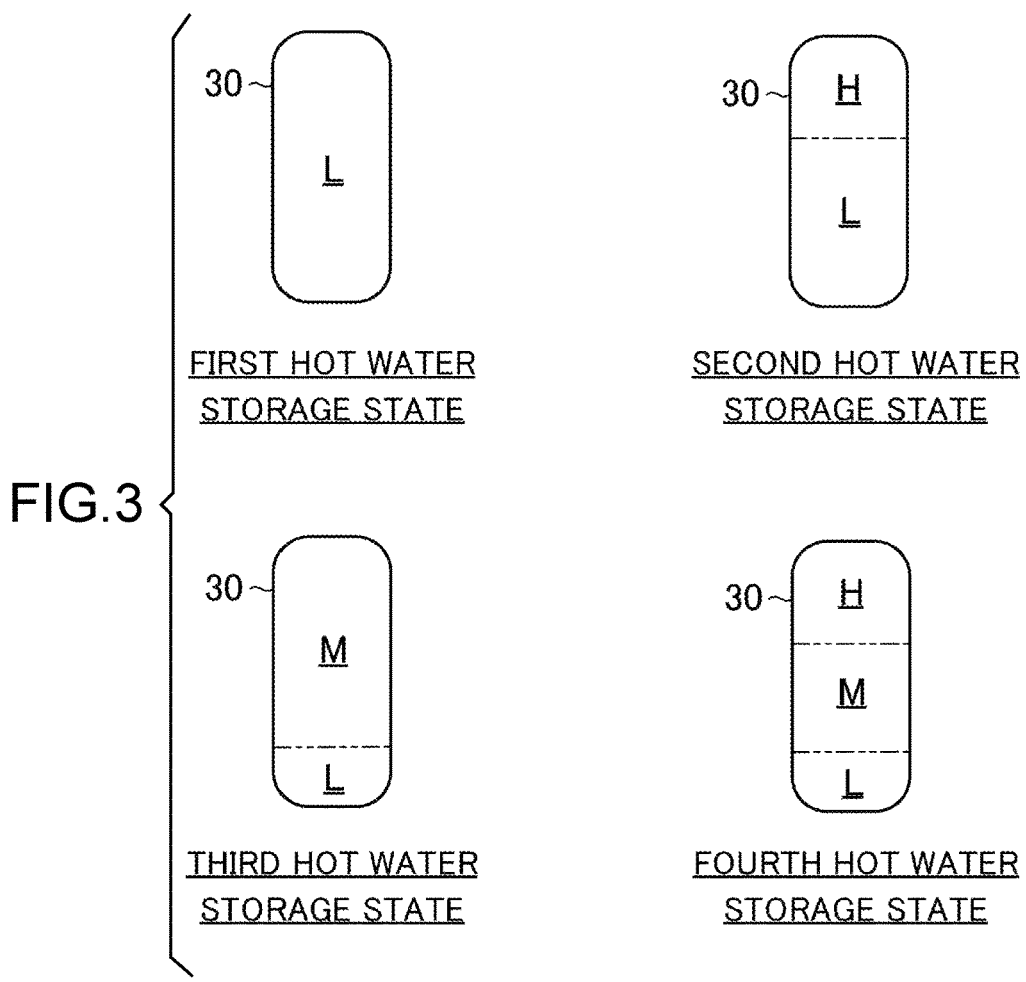
FIG. 3 schematically shows the hot water storage states in the tank.

In a fourth hot water storage state (see FIG. 3), which will be described in detail below, the upper storage portion (36) forms a high-temperature layer (H), the intermediate storage portion (35) forms a medium-temperature layer (M), and the lower storage portion (34) forms a low-temperature layer (L). The high-temperature layer (H), the medium-temperature layer (M), and the low-temperature layer (L) store water having different temperatures. The water in the high-temperature layer (H) (referred to also as "high-temperature water") has a temperature of, for example, about 60° C. The water in the medium-temperature layer (M) (referred to also as "medium-temperature water") has a temperature of, for example, about 40° C. The water in the low-temperature layer (L) (referred to also as "low-temperature water") has a temperature of, for example, about 10° C.

Pump

The pump (21) is a transferring device that transfers water in the hot water supply channel (40). The pump (21) is provided in a main heating channel (47).

Hot Water Supply Channel

The hot water supply channel (40) includes an inflow pipe (41), an outflow pipe (42), a first heating pipe (43), a second heating pipe (44), a first return pipe (45), a second return pipe (46), the main heating channel (47), a first three-way valve (51), and a second three-way valve (52).

The inflow pipe (41) is an inflow channel that allows the water source (S) and the lower storage portion (34) to communicate with each other. An inlet end of the inflow pipe (41) is connected to, for example, a pipe of a water supply system. An outlet end of the inflow pipe (41) is connected to the bottom portion (32) of the tank (30). The inflow pipe (41) supplies low-temperature water from the water source (S) to the tank (30) as appropriate. Specifically, supplying water in the tank (30) to the hot water supply target (T) reduces the internal pressure of the tank (30). The pressure difference between the water source (S) and the tank (30) increases accordingly. Thus, the tank (30) is refilled with low-temperature water from the water source (S) through the inflow pipe (41).

The outflow pipe (42) is an outflow channel that allows the upper storage portion (36) and the hot water supply target (T) to communicate with each other. An inlet end of the outflow pipe (42) is connected to the top portion (33) of the tank (30). An outlet end of the outflow pipe (42) is connected to a first mixing valve (53).

The first heating pipe (43) is a first heating channel that allows the intermediate storage portion (35) and an inlet side of the water heat exchanger (13) to communicate with each other. One end of the first heating pipe (43) is connected to an intermediate portion of the second return pipe (46). The other end of the second heating pipe (44) is connected to a first port of the first three-way valve (51).

The second heating pipe (44) is a second heating channel that allows the lower storage portion (34) and the inlet side of the water heat exchanger (13) to communicate with each other. One end of the second heating pipe (44) is connected to the bottom portion (32) of the tank (30). The other end of the second heating pipe (44) is connected to a second port of the first three-way valve (51).

The one end of the second heating pipe (44) may be connected directly to the inflow pipe (41) instead of being connected to the bottom portion (32) of the tank (30). This direct connection allows water in the lower storage portion (34) inside the tank (30) to be sequentially drawn into the inflow pipe (41) and the second heating pipe (44). This can reduce the number of pipes connected to the tank (30), and can simplify the structure of the tank (30).

The first return pipe (45) is a first return channel that allows an outlet side of the water heat exchanger (13) and the upper storage portion (36) to communicate with each other. One end of the first return pipe (45) is connected to the top portion (33) of the tank (30). The other end of the first return pipe (45) is connected to a first port of the second three-way valve (52).

The second return pipe (46) is a second return channel that allows the outlet side of the water heat exchanger (13) and the intermediate storage portion (35) to communicate with each other. One end of the second return pipe (46) is connected to the barrel (31) of the tank (30). The other end of the second return pipe (46) is connected to a second port of the second three-way valve (52).

The main heating channel (47) is a channel at which the water heat exchanger (13) is provided. The water channel (13b) of the water heat exchanger (13) is connected to an intermediate portion of the main heating channel (47). One end of the main heating channel (47) is connected to a third port of the first three-way valve (51). The other end of the main heating channel (47) is connected to a third port of the second three-way valve (52). The pump (21) is provided at a portion of the main heating channel (47) upstream of the water heat exchanger (13).

The first three-way valve (51) is a first switching mechanism that alternately changes the connection of the inlet side of the water heat exchanger (13) with the first heating pipe (43) or the second heating pipe (44). The first three-way valve (51) has the first, second, and third ports. The first three-way valve (51) switches between a first state (the state indicated by the solid curve in FIG. 1) and a second state (the state indicated by the broken curve in FIG. 1).

The first three-way valve (51) in the first state makes the third and first ports communicate with each other, and disconnects the third and second ports from each other. Specifically, the first three-way valve (51) in the first state makes the inlet side of the water heat exchanger (13) and the first heating pipe (43) communicate with each other, and disconnects the inlet side of the water heat exchanger (13) and the second heating pipe (44) from each other.

The first three-way valve (51) in the second state makes the third and second ports communicate with each other, and disconnects the third and first ports from each other. Specifically, the first three-way valve (51) in the second state makes the inlet side of the water heat exchanger (13) and the second heating pipe (44) communicate with each other, and disconnects the inlet side of the water heat exchanger (13) and the first heating pipe (43) from each other.

The second three-way valve (52) is a second switching mechanism that alternately changes the connection of the outlet side of the water heat exchanger (13) with the first return pipe (45) or the second return pipe (46). The second three-way valve (52) has the first, second, and third ports. The second three-way valve (52) switches between a first state (the state indicated by the solid curve in FIG. 1) and a second state (the state indicated by the broken curve in FIG. 1).

The second three-way valve (52) in the first state makes the third and first ports communicate with each other, and disconnects the third and second ports from each other. Specifically, the second three-way valve (52) in the first state makes the outlet side of the water heat exchanger (13) and the first return pipe (45) communicate with each other, and disconnects the outlet side of the water heat exchanger (13) and the second return pipe (46) from each other.

The second three-way valve (52) in the second state makes the third and second ports communicate with each other, and disconnects the third and first ports from each other. Specifically, the second three-way valve (52) in the second state makes the outlet side of the water heat exchanger (13) and the second return pipe (46) communicate with each other, and disconnects the outlet side of the water heat exchanger (13) and the first return pipe (45) from each other.

The hot water supply channel (40) includes a bypass channel (61), a branch channel (62), a first water supply channel (63), a second water supply channel (64), a main water supply channel (65), the first mixing valve (53), and a second mixing valve (54).

The bypass channel (61) is a channel for supplying water heated by the water heat exchanger (13) to the hot water supply target (T) by bypassing the tank (30). One end of the bypass channel (61) is connected to an outlet end of the main heating channel (47). The other end of the bypass channel (61) is connected to the first mixing valve (53).

The branch channel (62) is a channel into which a portion of the water heated by the water heat exchanger (13) can flow. One end of the branch channel (62) is connected to the outlet end of the main heating channel (47). The other end of the branch channel (62) is connected to the third port of the second three-way valve (52). In this example, the entirety or a portion of the water heated by the water heat exchanger (13) flows through the bypass channel (61). The remainder of the water heated by the water heat exchanger (13) flows through the branch channel (62).

The first water supply channel (63) is connected to outlet sides of the bypass channel (61) and outflow pipe (42). One end of the first water supply channel (63) is connected to the first mixing valve (53). The other end of the first water supply channel (63) is connected to the second mixing valve (54).

The second water supply channel (64) is a channel for delivering water from the water source (S) directly to the hot water supply target (T). One end of the second water supply channel (64) is connected to the inflow pipe (41). The other end of the second water supply channel (64) is connected to the second mixing valve (54).

The main water supply channel (65) is a channel for delivering water with a temperature adjusted to a predetermined temperature to the hot water supply target (T). One end of the main water supply channel (65) is connected to the second mixing valve (54). The other end of the main water supply channel (65) communicates with the predetermined hot water supply target (T).

The first mixing valve (53) is connected to the bypass channel (61), the outflow pipe (42), and the first water supply channel (63). The first mixing valve (53) adjusts the mixing ratio between water through the bypass channel (61) and water through the outflow pipe (42). The water mixed by the first mixing valve (53) flows into the first water supply channel (63).

The first mixing valve (53) is a first adjusting mechanism that adjusts the flow rate of water through the bypass channel (61) and the flow rate of water through the outflow pipe (42). The first mixing valve (53) is configured to be capable of opening and closing the outlet end of the bypass channel (61) and the outlet end of the outflow pipe (42). The adjustment of the flow rate of water through the bypass channel (61) by the first mixing valve (53) causes adjustment of the flow rate of water through the branch channel (62) and hence the flow rate of water through the first return pipe (45). The first mixing valve (53) is also used to adjust the flow rate of the first return pipe (45).

The second mixing valve (54) is connected to the first water supply channel (63), the second water supply channel (64), and the main water supply channel (65). The second mixing valve (54) adjusts the mixing ratio between water through the first water supply channel (63) and water through the second water supply channel (64). The water mixed by the second mixing valve (54) flows into the main water supply channel (65). The second mixing valve (54) adjusts the flow rate of water through the first water supply channel (63) and the flow rate of water through the second water supply channel (64). The second mixing valve (54) is configured to be capable of opening and closing the outlet end of the first water supply channel (63) and the outlet end of the second water supply channel (64).

Temperature Sensors

The tank (30) is provided therein with a first temperature sensor (71) and a second temperature sensor (72). The first temperature sensor (71) is disposed in the upper storage portion (36) corresponding to the high-temperature layer (H). The first temperature sensor (71) detects the temperature of water in the upper storage portion (36) (a first detected temperature (T1)). The second temperature sensor (72) is disposed in the intermediate storage portion (35) corresponding to the medium-temperature layer (M). The second temperature sensor (72) detects the temperature of water in the intermediate storage portion (35) (a second detected temperature (T2)).

The main heating channel (47) is provided with a third temperature sensor (73). The third temperature sensor (73) is provided at a portion of the main heating channel (47) corresponding to the outlet of the water heat exchanger (13). The third temperature sensor (73) detects the temperature of water at the outlet of the water channel (13b) of the water heat exchanger (13) (hereinafter referred to also as the "outlet temperature (To)").

Controller

The controller (25) is a control device that controls the heat source apparatus (10) and the hot water supply apparatus (20). The controller (25) includes a microcomputer and a memory device (specifically, a semiconductor memory) storing software for operating the microcomputer.

Strictly, the controller (25) controls the compressor (12), the expansion valve (14), and the outdoor fan (16). The controller (25) controls the pump (21), the first three-way valve (51), the second three-way valve (52), the first mixing valve (53), and the second mixing valve (54). The controller (25) controls the hot water supply channel (40) to change types of operations.

The controller (25) includes an input section (26), a setting section (27), a temperature determination section (28), and a demand determination section (29).

The input section (26) receives a signal indicating a demand for supply of hot water to the hot water supply target (T). For example, a user operates an operation section to input the signal to the input section (26) from the operation section.

The setting section (27) is used to set a first set temperature (Ts1), a second set temperature (Ts2), a set hot water temperature (Ths), a first target temperature (To1), and a second target temperature (To2). The first set temperature (Ts1) is used to determine whether there is a high-temperature layer (H) in the upper storage portion (36) of the tank (30). The second set temperature (Ts2) is used to determine whether there is a medium-temperature layer (M) in the intermediate storage portion (35) of the tank (30). The set hot water temperature (Ths) is a target temperature of water to be supplied to the hot water supply target (T).

The first and second set temperatures (Ts1) and (Ts2) may be fixed values set in advance when the hot water supply unit (1) is installed. The first and second set temperatures (Ts1) and (Ts2) may be variations that can be changed as appropriate by the user. The first and second set temperatures (Ts1) and (Ts2) may be determined by so-called learning control, based on the daily usage pattern of the hot water supply unit (1). Specifically, the learning control determines optimum values of the first and second set temperatures (Ts1) and (Ts2), based on the type of the hot water supply target (T) used by the user, the set hot water temperature (Ths) set as appropriate by the user, and other elements.

The temperature determination section (28) determines the state of hot water stored in the tank (30). The temperature determination section (28) determines the state of hot water stored in the tank (30), based on the first detected temperature (T1), the second detected temperature (T2), the first set temperature (Ts1), and the second set temperature (Ts2). This determination method will be described in detail below.

The demand determination section (29) determines a necessary quantity of heat (Qd) to be supplied to the hot water supply target (T) and the quantity of heat stored in the tank (30). The demand determination section (29) determines which hot water supply operation is to be executed, based on these indexes.

Operation

An operation of the hot water supply unit (1) will be described in detail. The hot water supply unit (1) performs a hot water storage operation and a hot water supply operation. The hot water storage operation is an operation for storing water heated by the water heat exchanger (13) in the tank (30). Basically, the hot water storage operation is performed while there is no demand from the hot water supply target (T). In the hot water storage operation, hot water is not supplied to the hot water supply target (T). The hot water storage operation includes first, second, and third hot water storage operations, which will be described in detail below.

The hot water supply operation is an operation for supplying at least one of the heated water in the tank (30) or the water heated by the water heat exchanger (13) to the hot water supply target (T). The hot water supply operation is performed while there is a demand from the hot water supply target (T). The hot water supply operation includes first, second, third, and fourth hot water supply operations, which will be described in detail below.

Determination of Hot Water Storage State

Figure 2:
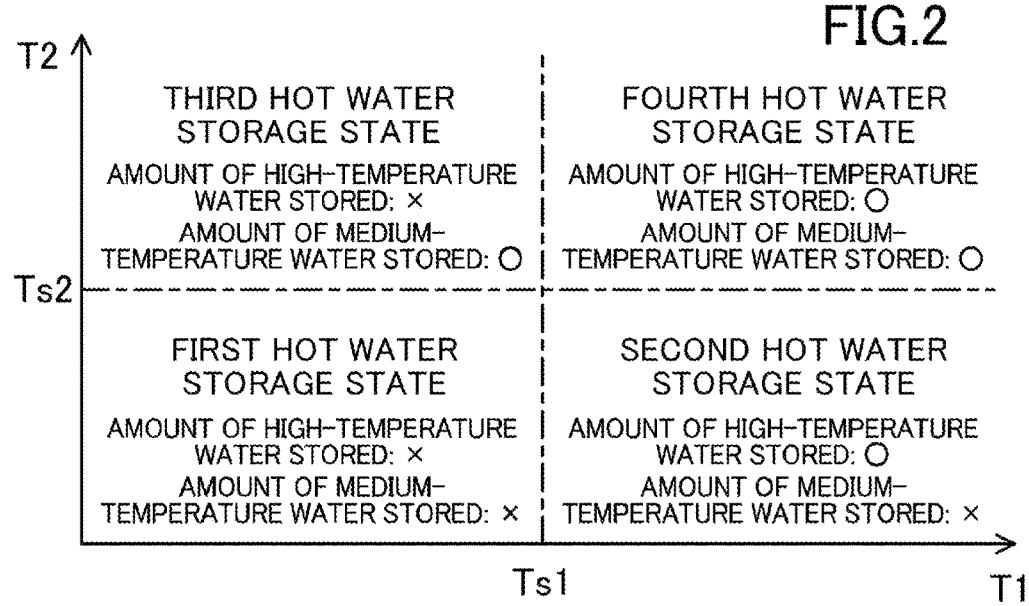
FIG. 2 is a graph showing the relationship between the internal temperature of a tank and hot water storage states in the tank.

In the hot water supply unit (1), the state of hot water stored in the tank (30) is determined as appropriate. In the hot water storage operation, types of the hot water storage operations are changed based on the result of determining the hot water storage state. A method for determining the hot water storage state will be described with reference to FIGS. 1 to 3.

The hot water storage state is determined based on the amount of high-temperature water stored in the tank (30) and the amount of medium-temperature water stored in the tank (30). Specifically, the hot water storage state in the tank (30) is determined based on the first detected temperature (T1), the second detected temperature (T2), the first set temperature (Ts1), and the second set temperature (Ts2). The first set temperature (Ts1) is a set value to be compared with the first detected temperature (T1). The first set temperature (Ts1) is set to be the temperature of high-temperature water corresponding to the high-temperature layer (H) (e.g., 60° C.). The second set temperature (Ts2) is a set value to be compared with the second detected temperature (T2). The second set temperature (Ts2) is set to be the temperature of medium-temperature water corresponding to the medium-temperature layer (M) (e.g., 40° C.). The temperature determination section (28) determines in which of the first, second, third, or fourth hot water storage state the hot water stored in the tank (30) is, in the following manner.

First Hot Water Storage State

If the first detected temperature (T1) is lower than the first set temperature (Ts1), and the second detected temperature (T2) is lower than the second set temperature (Ts2), the water in the tank is determined to be in the first hot water storage state. The first hot water storage state is a state where the amount of high-temperature water stored in the tank (30) and the amount of medium-temperature water stored in the tank (30) are insufficient. Thus, in the first hot water storage state, a low-temperature layer (L) is formed in the tank (30).

Second Hot Water Storage State

If the first detected temperature (T1) is higher than or equal to the first set temperature (Ts1), and the second detected temperature (T2) is lower than the second set temperature (Ts2), the water in the tank is determined to be in the second hot water storage state. The second hot water storage state is a state where the amount of high-temperature water stored in the tank (30) is sufficient and the amount of medium-temperature water stored in the tank (30) is insufficient. Thus, in the second hot water storage state, a high-temperature layer (H) and a low-temperature layer (L) are formed in the tank (30).

Third Hot Water Storage State

If the first detected temperature (T1) is lower than the first set temperature (Ts1), and the second detected temperature (T2) is higher than or equal to the second set temperature (Ts2), the water in the tank is determined to be in the third hot water storage state. The third hot water storage state is a state where the amount of high-temperature water stored in the tank (30) is insufficient and the amount of medium-temperature water stored in the tank (30) is sufficient. Thus, in the third hot water storage state, a medium-temperature layer (M) is formed in the tank (30).

Fourth Hot Water Storage State

If the first detected temperature (T1) is higher than or equal to the first set temperature (Ts1), and the second detected temperature (T2) is higher than or equal to the second set temperature (Ts2), the water in the tank is determined to be in the fourth hot water storage state. The fourth hot water storage state is a state where the amount of high-temperature water stored in the tank (30) and the amount of medium-temperature water stored in the tank (30) are sufficient. Thus, in the fourth hot water storage state, a high-temperature layer (H), a medium-temperature layer (M), and a low-temperature layer (L) are formed in the tank (30).

Hot Water Storage Operation

The hot water storage operation will be described in detail. In the hot water storage operation, any one of the first, second, or third hot water storage operation is executed. In each of the hot water storage operations, the heat source apparatus (10) shown in FIG. 1 is operated, and the pump (21) is turned on.

While the heat source apparatus (10) operates during the hot water storage operation, the compressor (12) is driven and the opening degree of the expansion valve (14) is adjusted. A refrigeration cycle is performed in the refrigerant circuit (11). Specifically, the refrigerant compressed in the compressor (12) flows through the refrigerant channel (13a) of the water heat exchanger (13). In the water heat exchanger (13), refrigerant in the refrigerant channel (13a) dissipates heat to water in the water channel (13b). As a result, the refrigerant in the refrigerant channel (13a) condenses. The refrigerant that has dissipated heat in the water heat exchanger (13) is decompressed by the expansion valve (14), and then flows through the air heat exchanger (15). In the air heat exchanger (15), the refrigerant evaporates in the air heat exchanger (15). The evaporated refrigerant is sucked into the compressor (12).

The pump (21) is operated in the hot water supply apparatus (20) during the hot water storage operation. Water in the tank (30) is heated by the water heat exchanger (13), and then returns to the tank (30).

In the hot water storage operation, the hot water supply unit (1) is controlled so that water that has flowed out of the water channel (13b) of the water heat exchanger (13) has a predetermined temperature. Specifically, in the hot water storage operation, the outlet temperature (To) of the water channel (13b) detected by the third temperature sensor (73) is controlled to approach its target temperature. Specifically, the outlet temperature (To) is adjusted based on the heating capacity of the heat source apparatus (10) and the flow rate of water through the water channel (13b).

First Hot Water Storage Operation

Figure 4:
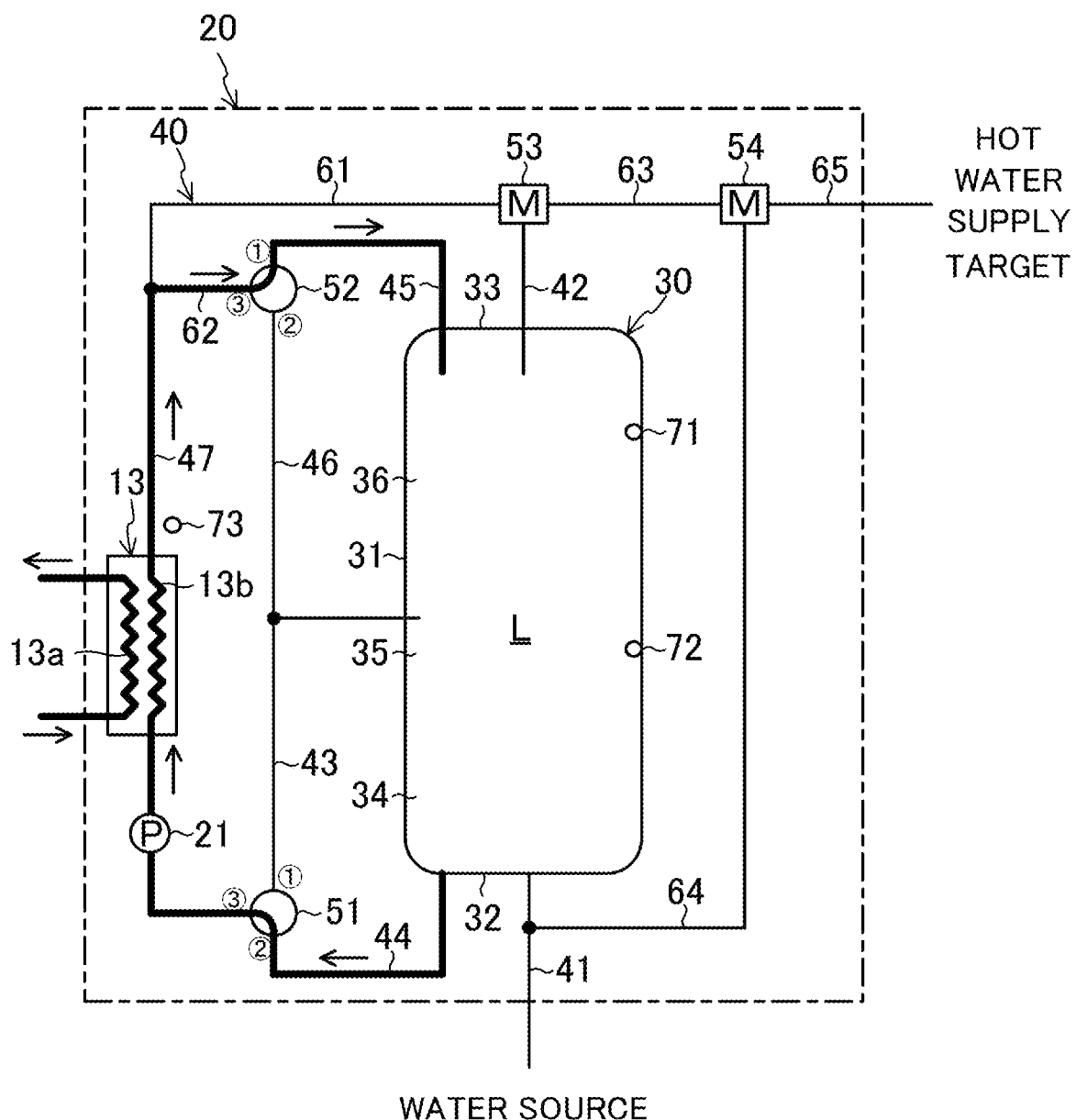
FIG. 4 is a schematic piping system diagram of a hot water supply apparatus, and illustrates a first hot water storage operation.

If it is determined that the tank (30) is in the first hot water storage state while there is no demand from the hot water supply target (T), the first hot water storage operation shown in FIG. 4 is executed. In other words, while the amount of high-temperature water stored in the tank (30) and the amount of medium-temperature water stored therein are insufficient, the first hot water storage operation is executed. In the first hot water storage operation, low-temperature water is heated to high-temperature water, which is stored in the tank (30).

In the first hot water storage operation, the heat source apparatus (10) is operated. The first three-way valve (51) is in the second state, and the second three-way valve (52) is in the first state. The first mixing valve (53) closes the outlet ends of the outflow pipe (42) and bypass channel (61). The second mixing valve (54) closes the outlet ends of the first water supply channel (63) and the second water supply channel (64).

The pump (21), when operated, causes the low-temperature water in the lower storage portion (34) in the tank (30) to flow into the second heating pipe (44). This water flows through the water channel (13b) of the water heat exchanger (13), and is heated to high-temperature water. In the first hot water storage operation, the outlet temperature (To) is controlled to approach the first target temperature (To1) (a first temperature). The first target temperature (To1) is a predetermined temperature higher than or equal to the set hot water temperature (Ths) set in the setting section (27). In one preferred embodiment, the first target temperature (To1) is a predetermined temperature higher than or equal to the first set temperature (Ts1) set in the setting section (27).

The high-temperature water heated to the first target temperature (To1) by the water heat exchanger (13) flows through the branch channel (62) and the first return pipe (45) into the upper storage portion (36) of the tank (30).

The first hot water storage operation as described above gradually forms a high-temperature layer (H) in the tank (30). A demand for supply of hot water to the hot water supply target (T) can be satisfied by the preferential storage of the high-temperature water in the tank (30) as described above.

Second Hot Water Storage Operation

Figure 5:
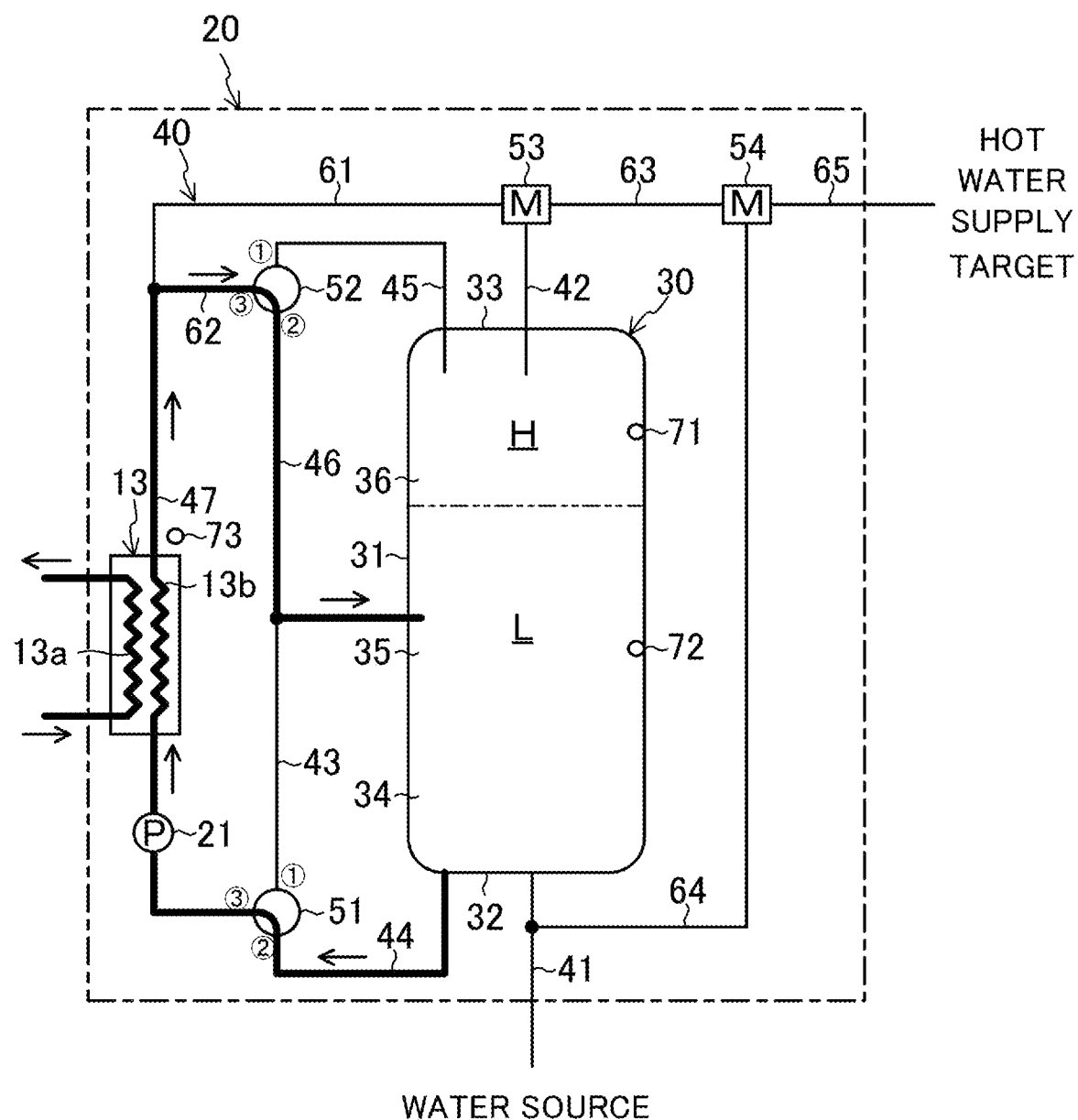
FIG. 5 is a schematic piping system diagram of the hot water supply apparatus, and illustrates a second hot water storage operation.

If it is determined that the tank (30) is in the second hot water storage state while there is no demand from the hot water supply target (T), the second hot water storage operation shown in FIG. 5 is executed. In other words, while the amount of high-temperature water stored in the tank (30) is sufficient, and the amount of medium-temperature water stored therein is insufficient, the second hot water storage operation is executed. In the second hot water storage operation, low-temperature water is heated to medium-temperature water, which is stored in the tank (30).

In the second hot water storage operation, the heat source apparatus (10) is operated. The first three-way valve (51) is in the second state, and the second three-way valve (52) is in the second state. The first mixing valve (53) closes the outlet ends of the outflow pipe (42) and bypass channel (61). The second mixing valve (54) closes the outlet ends of the first water supply channel (63) and the second water supply channel (64).

The pump (21), when operated, causes the low-temperature water in the lower storage portion (34) in the tank (30) to flow into the second heating pipe (44). This water flows through the water channel (13b) of the water heat exchanger (13), and is heated to medium-temperature water. In the second hot water storage operation, the outlet temperature (To) is controlled to approach the second target temperature (To2) (a second temperature). The second target temperature (To2) is a predetermined temperature lower than the set hot water temperature (Ths) set in the setting section (27). In one preferred embodiment, the second target temperature (To2) is a predetermined temperature higher than or equal to the second set temperature (Ts2) set in the setting section (27).

The medium-temperature water heated to the second target temperature (To2) by the water heat exchanger (13) flows through the branch channel (62) and the second return pipe (46) into the intermediate storage portion (35) of the tank (30).

The second hot water storage operation as described above gradually forms a medium-temperature layer (M) in the tank (30). The high-temperature layer (H), the medium-temperature layer (M), and the low-temperature layer (L) are therefore formed in the tank (30). Thus, the state of hot water stored in the tank (30) can shift quickly to the fourth hot water storage state (see FIG. 3).

Third Hot Water Storage Operation

Figure 6:
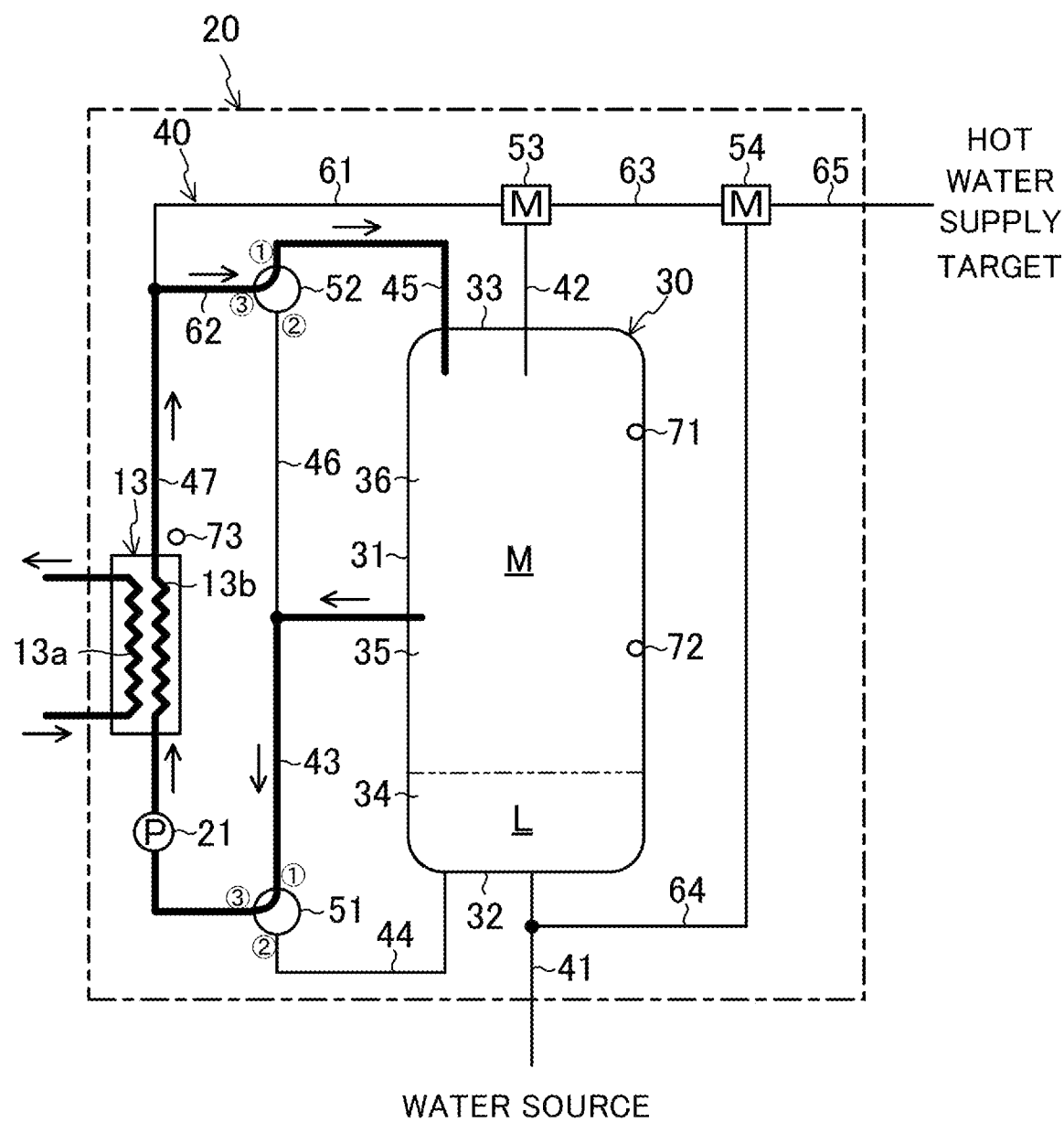
FIG. 6 is a schematic piping system diagram of the hot water supply apparatus, and illustrates a third hot water storage operation.

If it is determined that the tank (30) is in the third hot water storage state while there is no demand from the hot water supply target (T), the third hot water storage operation shown in FIG. 6 is executed. In other words, while the amount of high-temperature water stored in the tank (30) is insufficient, and the amount of medium-temperature water stored therein is sufficient, the third hot water storage operation is executed. In the third hot water storage operation, medium-temperature water is heated to high-temperature water, which is stored in the tank (30).

In the third hot water storage operation, the heat source apparatus (10) is operated. The first three-way valve (51) is in the first state, and the second three-way valve (52) is in the first state. The first mixing valve (53) closes the outlet ends of the outflow pipe (42) and bypass channel (61). The second mixing valve (54) closes the outlet ends of the first water supply channel (63) and the second water supply channel (64).

The pump (21), when operated, causes medium-temperature water in the intermediate storage portion (35) in the tank (30) to flow into the first heating pipe (43). This water flows through the water channel (13b) of the water heat exchanger (13), and is heated to high-temperature water. In the third hot water storage operation, the outlet temperature (To) is controlled to approach the first target temperature (To1) (the first temperature).

The high-temperature water heated to the first target temperature (To1) by the water heat exchanger (13) flows through the branch channel (62) and the first return pipe (45) into the upper storage portion (36) of the tank (30).

The third hot water storage operation as described above gradually forms a high-temperature layer (H) in the tank (30). The high-temperature layer (H), the medium-temperature layer (M), and the low-temperature layer (L) are therefore formed in the tank (30). Thus, the state of hot water stored in the tank (30) can shift quickly to the fourth hot water storage state (see FIG. 3).

Hot Water Supply Operation

The hot water supply operation will be described in detail. In the hot water supply operation, any one of the first, second, third, or fourth hot water supply operation is executed. The hot water supply operations are executed when the input section (26) of the controller (25) receives a signal indicating a demand from the hot water supply target (T). In each of the hot water supply operations, heated water is supplied to the hot water supply target (T) at least by the pressure of water from the water source (S).

In each of the hot water supply operations, the hot water supply unit (1) is controlled so that the temperature of supply water to be supplied to the hot water supply target (T) approaches the set hot water temperature (Ths). Specifically, the temperature of the supply water is adjusted based on the flow rate of water through the bypass channel (61) and the flow rate of water through the outflow pipe (42). In addition, the temperature of the supply water is adjusted based on the flow rate of water through the first water supply channel (63) and the flow rate of water through the second water supply channel (64). The flow rate of water through the bypass channel (61) and the flow rate of water through the outflow pipe (42) are adjusted by the first mixing valve (53). The flow rate of water through the first water supply channel (63) and the flow rate of water through the second water supply channel (64) are adjusted by the second mixing valve (54).

In addition, in each of the first, third, and fourth hot water supply operations, similarly to the hot water storage operation, the outlet temperature (To) of the water channel (13b) of the water heat exchanger (13) is controlled to approach its target temperature.

First Hot Water Supply Operation

Figure 7:
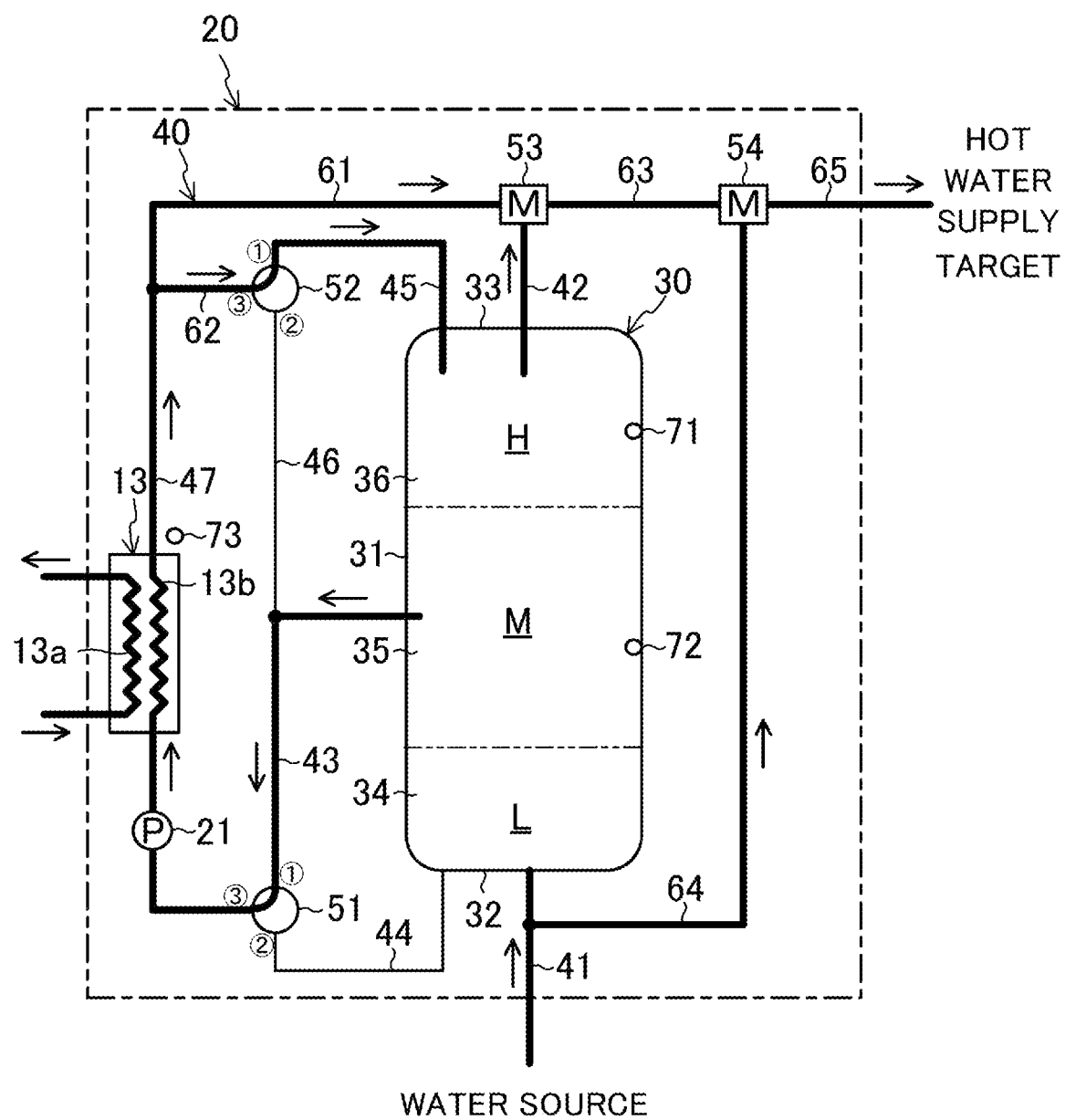
FIG. 7 is a schematic piping system diagram of the hot water supply apparatus, and illustrates a first hot water supply operation.

In the first hot water supply operation shown in FIG. 7, medium-temperature water in the tank (30) is heated to high-temperature water, which is supplied to the hot water supply target (T). Basically, the first hot water supply operation is executed while the tank (30) is in the third hot water storage state.

The first hot water supply operation is executed when the quantity of heat stored (Qa) in the tank (30) is not large enough to satisfy the demand from the hot water supply target (T). Specifically, when the demand determination section (29) determines that the quantity of heat stored (Qa) is smaller than the necessary quantity of heat (Qd), the controller (25) causes the execution of first hot water supply operation.

The first hot water supply operation may be executed under conditions where the demand determination section (29) cannot predict the necessary quantity of heat (Qd) for the hot water supply target (T).

Even if the quantity of heat stored (Qa) is insufficient for the necessary quantity of heat (Qd), high-temperature water in the tank (30), if any, may be supplied through the outflow pipe (42) to the hot water supply target (T).

The quantity of heat stored (Qa) is the quantity of heat stored in heated water in the tank (30). The quantity of heat stored (Qa) is determined based on the first and second detected temperatures (T1) and (T2). To more accurately determine the quantity of heat stored (Qa), three or more temperature sensors may be provided in the tank (30).

The necessary quantity of heat (Qd) is the total quantity of heat of supply water necessary for satisfying the demand for supply of hot water to the hot water supply target (T). The necessary quantity of heat (Qd) is determined based on the type of the hot water supply target (T) from which there is a demand for supply of hot water.

In the first hot water supply operation, the pump (21) is turned on; the first three-way valve (51) is in the first state; and the second three-way valve (52) is in the first state. The first mixing valve (53) opens the outlet ends of the outflow pipe (42) and bypass channel (61). The second mixing valve (54) opens the outlet end of at least the first water supply channel (63).

The pump (21), when operated, causes medium-temperature water in the medium-temperature layer (M) in the tank (30) to flow into the first heating pipe (43). Meanwhile, low-temperature water in the water source (S) is supplied through the inflow pipe (41) to the lower storage portion (34) of the tank (30) as appropriate. The medium-temperature water in the first heating pipe (43) flows through the water channel (13b) of the water heat exchanger (13), and is heated to high-temperature water. In the first hot water supply operation, the outlet temperature (To) is controlled to approach the first target temperature (To1) (the first temperature) described above.

The high-temperature water heated to the first target temperature (To1) by the water heat exchanger (13) is delivered to at least the bypass channel (61).

On the other hand, high-temperature water in the high-temperature layer (H) in the tank (30) is delivered to the outflow pipe (42). The high-temperature water in the bypass channel (61) and the high-temperature water in the outflow pipe (42) are mixed in the first mixing valve (53). The water mixed in the first mixing valve (53) sequentially flows through the first water supply channel (63) and the main water supply channel (65), and is supplied to the hot water supply target (T).

As illustrated in FIG. 7, in a case in which a portion of the high-temperature water heated by the water heat exchanger (13) is supplied to the bypass channel (61), the remaining portion of the high-temperature water is returned through the branch channel (62) and the first return pipe (45) to the upper storage portion (36) of the tank (30). Thus, the high-temperature water can be stored in the tank (30) while the high-temperature water is supplied to the hot water supply target (T).

On the other hand, in a case in which the entirety of the high-temperature water heated by the water heat exchanger (13) is supplied to the bypass channel (61), no high-temperature water is supplied to the upper storage portion (36). As can be seen, in the first hot water supply operation, a surplus of the high-temperature water heated by the water heat exchanger (13) and not flowing through the bypass channel (61) is returned to the tank (30).

The first hot water supply operation is executed when the input section (26) receives a signal indicating a demand from the hot water supply target (T) during the third hot water storage operation (see FIG. 6). In the third hot water storage operation, medium-temperature water is heated to high-temperature water by the water heat exchanger (13). Adjusting the opening degree of the first mixing valve (53) and delivering the high-temperature water to the bypass channel (61) in the third hot water storage operation enable a shift from the third hot water storage operation to the first hot water supply operation. Thus, the third hot water storage operation can shift to the first hot water supply operation without significantly changing the flow of water through the hot water supply channel (40).

As can be seen from the foregoing description, the first hot water supply operation includes an operation of heating medium-temperature water in the medium-temperature layer (M) of the tank (30) to high-temperature water by the water heat exchanger (13), and supplying the thus-obtained high-temperature water to the hot water supply target (T).

In a case in which low-temperature water is heated to high-temperature water by the water heat exchanger (13), there is a great difference between the water temperatures at the inlet and outlet of the water channel (13b) of the water heat exchanger (13). The flow rate of water through the water channel (13b) therefore needs to be reduced to heat the low-temperature water to high-temperature water, which may result in failing to supply a sufficient amount of high-temperature water to the hot water supply target (T). Alternatively, the water heat exchanger (13) needs to be increased in size, or the heating capacity of the heat source apparatus (10) needs to be increased, in order to ensure a sufficient flow rate of water through the water channel (13b) of the water heat exchanger (13).

On the other hand, in the first hot water supply operation, medium-temperature water is heated to high-temperature water. Thus, the difference between the water temperatures at the inlet and outlet of the water channel (13b) of the water heat exchanger (13) is relatively small. It is therefore possible to ensure a sufficient flow rate of water through the water channel (13b) of the water heat exchanger (13), enabling a supply of a sufficient amount of high-temperature water to the hot water supply target (T). This eliminates the need for increasing the size of the water heat exchanger (13).

The hot water supply unit (1) heats low-temperature water to medium-temperature water in the above-described hot water storage operation, and heats medium-temperature water to high-temperature water in the first hot water supply operation. According to this embodiment, it is therefore possible to achieve a higher coefficient of performance (COP) of the heat source apparatus (10), compared to the case in which low-temperature water is heated to high-temperature water by the water heat exchanger (13). For example, the COP of a case in which the water heat exchanger (13) heats low-temperature water of 10° C. to high-temperature water of 65° C. is referred to as "C1." The COP of a case in which the water heat exchanger (13) heats low-temperature water of 10° C. to medium-temperature water of 40° C. is referred to as "C2." The COP of a case in which medium-temperature water of 40° C. is heated to high-temperature water of 65° C. is referred to as "C3." The average of C2 and C3 is referred to as "C4." C4 is an average COP obtained by so-called two stage heating, that is, heating low-temperature water to medium-temperature water, and the medium-temperature water to high-temperature water in the water heat exchanger (13).

The results of trial calculations show that the COP (C4) of this embodiment is about 11% higher than the coefficient C1.

In the first hot water supply operation, the high-temperature water heated is supplied through the bypass channel (61) to the hot water supply target (T). In other words, the high-temperature water heated bypasses the tank (30), and is supplied to the hot water supply target (T). If a large amount of high-temperature water is returned to the tank (30), heat dissipation loss in the high-temperature layer (H) of the tank (30) increases. This is because heat of the high-temperature water is released easily to the outside of the tank (30), and also because the heat of the high-temperature water transfers easily to the medium-temperature layer (M) and the low-temperature layer (L).

To address this, in the first hot water supply operation, the high-temperature water heated bypasses the tank (30). This can reduce the heat dissipation loss described above.

Second Hot Water Supply Operation

Figure 8:
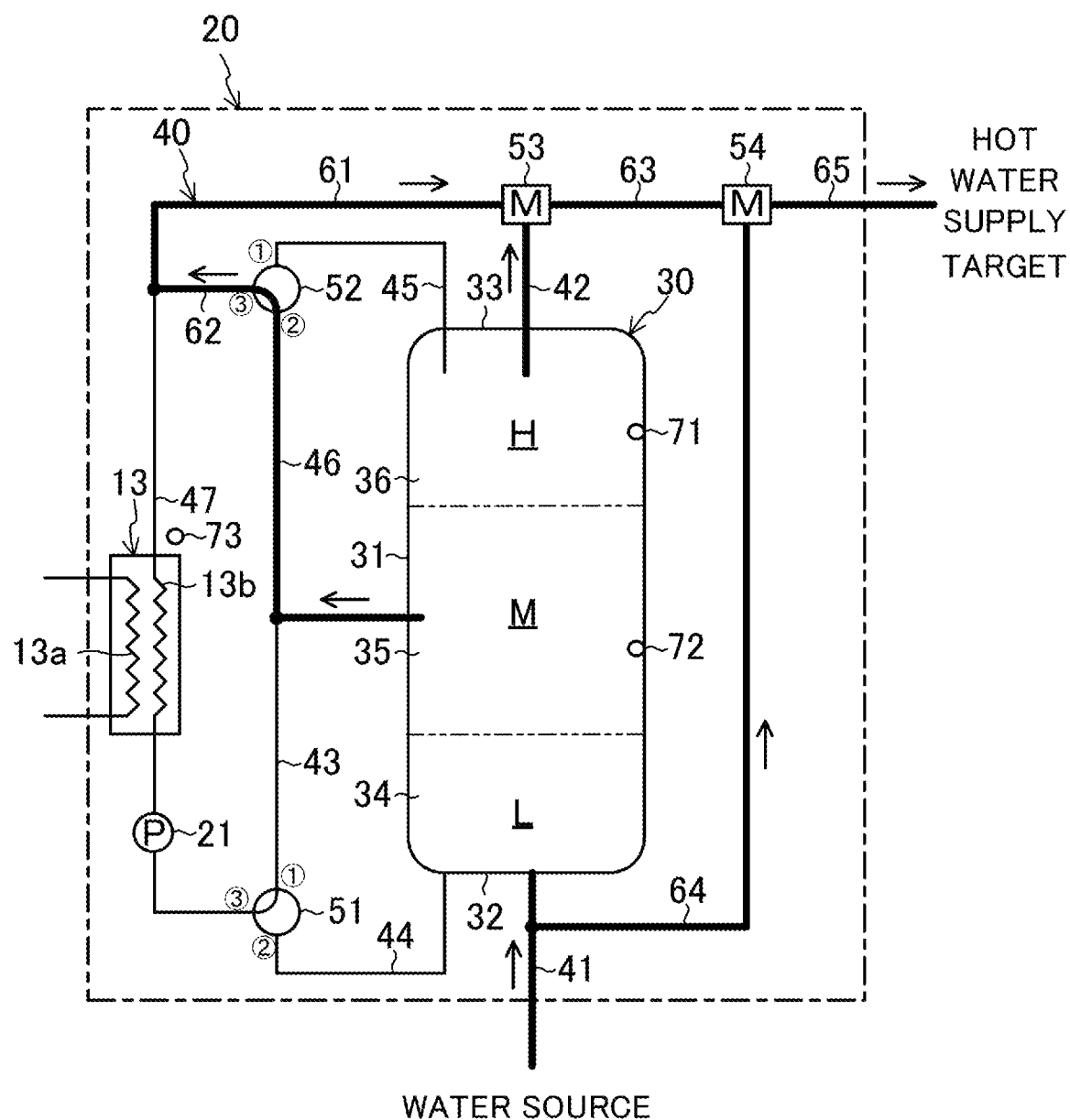
FIG. 8 is a schematic piping system diagram of the hot water supply apparatus, and illustrates a second hot water supply operation.

In the second hot water supply operation shown in FIG. 8, medium-temperature water in the tank (30) is supplied to the hot water supply target (T) without being heated. Basically, the second hot water supply operation is executed while the tank (30) is in the fourth hot water storage state. When the second hot water supply operation is executed in the fourth hot water storage state, high-temperature water in the tank (30), too, is supplied to the hot water supply target (T). Note that in a state in which there is a medium-temperature layer (M) in the intermediate storage portion (35) in the tank (30), the second hot water supply operation may be executed even when the tank (30) is not in the fourth hot water storage state.

The second hot water supply operation is executed when the necessary quantity of heat (Qd) for the hot water supply target (T) is relatively small. Specifically, the second hot water supply operation is executed in a case, for example, in which hot water is supplied only to a faucet or a shower as the hot water supply target (T).

More specifically, when the demand determination section (29) determines that the quantity of heat stored (Qa) is larger than or equal to the necessary quantity of heat (Qd) and that the necessary quantity of heat (Qd) is smaller than a predetermined threshold (Qs), the controller (25) causes execution of the second hot water supply operation.

In the second hot water supply operation, the heat source apparatus (10) stops; the pump (21) is turned off; the first three-way valve (51) is in the second state; and the second three-way valve (52) is in the second state. The first mixing valve (53) opens the outlet ends of the outflow pipe (42) and bypass channel (61). The second mixing valve (54) opens the outlet end of at least the first water supply channel (63).

In the second hot water supply operation, water in the hot water supply channel (40) is transferred due to the differential pressure between the water source (S) and the hot water supply target (T). Medium-temperature water in the medium-temperature layer (M) of the tank (30) flows through the second return pipe (46). The direction of water flowing through the second return pipe (46) in the second hot water supply operation is opposite to the direction of water flowing through the second return pipe (46) in the third hot water supply operation, which will be described in detail below. The medium-temperature water in the second return pipe (46) is delivered to the bypass channel (61).

On the other hand, high-temperature water in the high-temperature layer (H) in the tank (30) is delivered to the outflow pipe (42). The medium-temperature water in the bypass channel (61) and the high-temperature water in the outflow pipe (42) are mixed in the first mixing valve (53). Adjusting the mixing ratio between these types of water enables adjustment of the temperature of the mixed water. The water mixed in the first mixing valve (53) sequentially flows through the first water supply channel (63) and the main water supply channel (65), and is supplied to the hot water supply target (T).

As can be seen from the foregoing description, in the second hot water supply operation, the second return pipe (46) is used as a channel for delivering medium-temperature water to the hot water supply target (T). In other words, the second return pipe (46) serves as a channel for returning water to the tank (30) in the third hot water supply operation, which will be described in detail below, and also as a channel for supplying water to the hot water supply target (T) in the second hot water supply operation. This can simplify the hot water supply channel (40).

Third Hot Water Supply Operation

Figure 9:
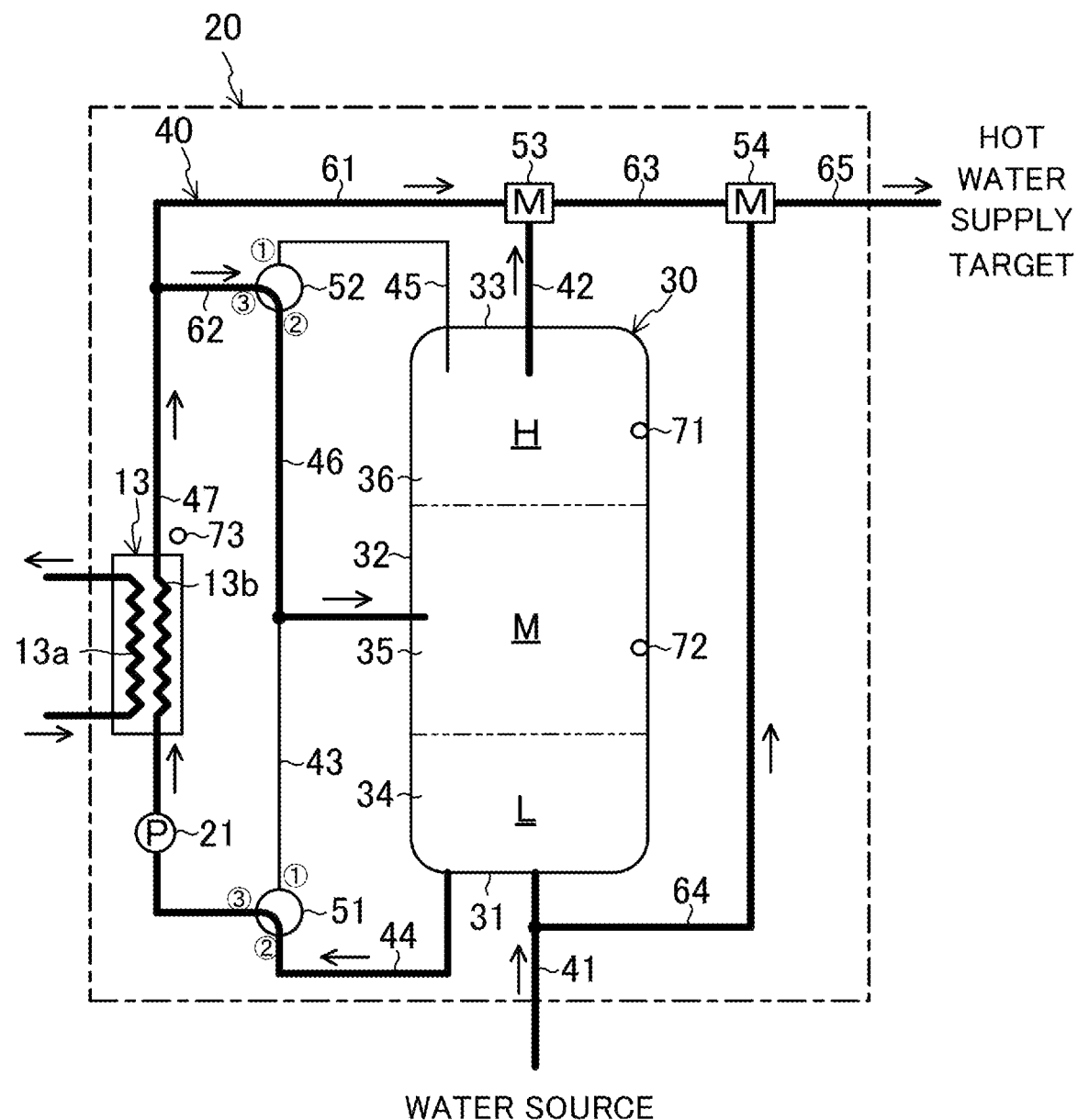
FIG. 9 is a schematic piping system diagram of the hot water supply apparatus, and illustrates a third hot water supply operation.

In the third hot water supply operation shown in FIG. 9, low-temperature water in the tank (30) is heated to medium-temperature water, which is supplied to the hot water supply target (T). The third hot water supply operation is executed while the tank (30) is in the fourth hot water storage state or the second hot water storage state. When the third hot water supply operation is executed in the fourth hot water storage state or the second hot water storage state, high-temperature water in the tank (30), too, is supplied to the hot water supply target (T).

The third hot water supply operation is executed when the quantity of heat stored (Qa) in the tank (30) can satisfy the demand from the hot water supply target (T) and when the necessary quantity of heat (Qd) for the hot water supply target (T) is larger than in the second hot water supply operation.

More specifically, when the demand determination section (29) determines that the quantity of heat stored (Qa) is larger than or equal to the necessary quantity of heat (Qd) and that the necessary quantity of heat (Qd) is larger than or equal to the threshold (Qs) described above, the controller (25) causes execution of the third hot water supply operation.

As can be seen from the foregoing description, the demand determination section (29) determines which of the first, second, or third hot water supply operation is to be executed, based on the necessary quantity of heat (Qd) for the hot water supply target (T) and the quantity of heat stored (Qa) in the tank (30).

In the third hot water supply operation, the pump (21) is turned on; the first three-way valve (51) is in the second state; and the second three-way valve (52) is in the second state. The first mixing valve (53) opens the outlet ends of the outflow pipe (42) and bypass channel (61). The second mixing valve (54) opens the outlet end of at least the first water supply channel (63).

The pump (21), when operated, causes the low-temperature water in low-temperature layer (L) in the tank (30) to flow into the second heating pipe (44). Meanwhile, low-temperature water in the water source (S) is supplied through the inflow pipe (41) to the lower storage portion (34) of the tank (30) as appropriate. The low-temperature water in the second heating pipe (44) flows through the water channel (13*b*) of the water heat exchanger (13), and is heated to medium-temperature water. In the third hot water supply operation, the outlet temperature (To) is controlled to approach the second target temperature (To2) (the second temperature) described above.

The medium-temperature water heated to the second target temperature (To2) by the water heat exchanger (13) is delivered to at least the bypass channel (61).

On the other hand, high-temperature water in the high-temperature layer (H) in the tank (30) is delivered to the outflow pipe (42). The medium-temperature water in the bypass channel (61) and the high-temperature water in the outflow pipe (42) are mixed in the first mixing valve (53). The water mixed in the first mixing valve (53) sequentially flows through the first water supply channel (63) and the main water supply channel (65), and is supplied to the hot water supply target (T).

As illustrated in FIG. 9, in a case in which a portion of the medium-temperature water heated by the water heat exchanger (13) is supplied to the bypass channel (61), the remaining portion of the medium-temperature water is returned through the branch channel (62) and the second return pipe (46) to the intermediate storage portion (35) of the tank (30). Thus, the medium-temperature water can be stored in the tank (30) while being supplied to the hot water supply target (T).

On the other hand, in a case in which the entirety of the medium-temperature water heated by the water heat exchanger (13) is supplied to the bypass channel (61), no medium-temperature water is supplied to the intermediate storage portion (35). As can be seen, in the third hot water supply operation, a surplus of the medium-temperature water heated by the water heat exchanger (13) and not flowing through the bypass channel (61) is returned to the tank (30).

The third hot water supply operation is executed when the input section (26) receives a signal indicating a demand from the hot water supply target (T) during the second hot water storage operation (see FIG. 5). In the second hot water storage operation, low-temperature water is heated to medium-temperature water by the water heat exchanger (13). Adjusting the opening degree of the first mixing valve (53) and delivering the medium-temperature water to the bypass channel (61) in the second hot water storage operation enable a shift from the second hot water storage operation to the third hot water supply operation. Thus, the second hot water storage operation can shift to the third hot water supply operation without significantly changing the flow of water through the hot water supply channel (40).

As can be seen from the foregoing description, the third hot water supply operation includes an operation of heating, by the water heat exchanger (13), low-temperature water in the low-temperature layer (L) of the tank (30) to medium-temperature water and supplying the thus-obtained medium-temperature water to the hot water supply target (T). It is therefore possible to reduce the difference between the water temperatures at the inlet and outlet of the water heat exchanger (13), and supply a sufficient amount of medium-temperature water to the hot water supply target (T). In addition, an increase in size of the water heat exchanger (13) and an increase in the heating capacity of the heat source apparatus (10) can be substantially prevented.

In the third hot water supply operation, the COP of the heat source apparatus (10) can be further increased compared to the first hot water supply operation, because the results of trial calculations show that the COP (C2 described above) in the case of heating low-temperature water to medium-temperature water by the water heat exchanger (13) is higher than the COPs (C1, C3, and C4) under the other conditions described above. Thus, in the third hot water supply operation, the COP can be further increased compared to the case of the first hot water supply operation.

In the above-described second hot water storage operation, too, the low-temperature water is heated to medium-temperature water by the water heat exchanger (13). Thus, in the second hot water storage operation, too, the COP can be increased similarly to the case of the third hot water supply operation.

As described above, the third hot water supply operation is executed when the quantity of heat stored (Qa) in the tank (30) is sufficient for the necessary quantity of heat (Qd) for the hot water supply target (T). In contrast, the first hot water supply operation is executed when the quantity of heat stored (Qa) in the tank (30) is insufficient for the necessary quantity of heat (Qd) for the hot water supply target (T). As can be seen, the first hot water supply operation is executed only when there is a demand for supply of a large amount of water to the hot water supply target (T). Thus, in a normal operation of the hot water supply unit (1), the proportion of the period of the execution of the third hot water supply operation is larger than the proportion of the period of the execution of the first hot water supply operation. Since the COP (C2) in the third hot water supply operation is higher than the average COP (C4) obtained by the two stage heating associated with the first hot water supply operation, an increase in the proportion of the period of the execution of the third hot water supply operation can improve the energy conservation of the hot water supply unit (1). On the other hand, if there is a demand for supply of a large amount of hot water to the hot water supply target (T), the execution of the first hot water supply operation can quickly satisfy such a demand for supply of the large amount of hot water.

Fourth Hot Water Supply Operation

Figure 10:
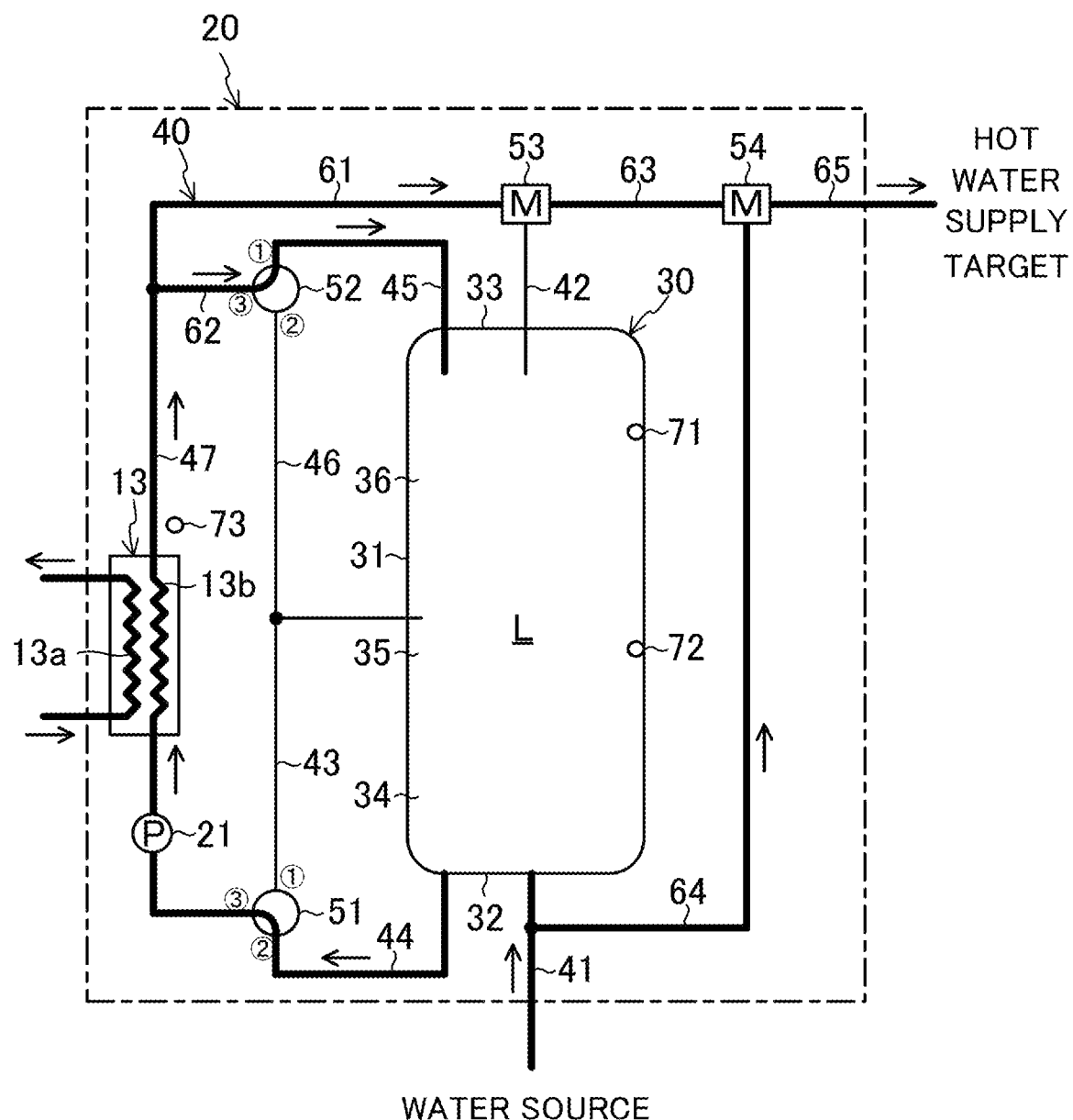
FIG. 10 is a schematic piping system diagram of the hot water supply apparatus, and illustrates a fourth hot water supply operation.

In the fourth hot water supply operation shown in FIG. 10, low-temperature water in the tank (30) is heated to high-temperature water, which is supplied to the hot water supply target (T). The fourth hot water supply operation is executed when the input section (26) receives a signal indicating a demand from the hot water supply target (T) during the first hot water storage operation (see FIG. 4) described above. Thus, basically, the fourth hot water supply operation is executed while the tank (30) is in the first hot water storage state (see FIG. 3).

More specifically, if the temperature determination section (28) determines that the tank (30) is in the first hot water storage state, and the input section (26) receives a signal indicating a demand from the hot water supply target (T), the controller (25) causes execution of the fourth hot water supply operation. In other words, the controller (25) causes the execution of the fourth hot water supply operation when there is a demand from the hot water supply target (T) while water in the high-temperature layer (H) of the tank (30) and water in the medium-temperature layer (M) are insufficient.

In the fourth hot water supply operation, the pump (21) is turned on; the first three-way valve (51) is in the second state; and the second three-way valve (52) is in the first state. The first mixing valve (53) closes the outlet end of the outflow pipe (42), and opens the outlet end of the bypass channel (61). The second mixing valve (54) opens the outlet end of at least the first water supply channel (63).

The pump (21), when operated, causes the low-temperature water in low-temperature layer (L) in the tank (30) to flow into the second heating pipe (44). Meanwhile, low-temperature water in the water source (S) is supplied through the inflow pipe (41) to the lower storage portion (34) of the tank (30) as appropriate. The low-temperature water in the second heating pipe (44) flows through the water channel (13*b*) of the water heat exchanger (13), and is heated to high-temperature water. In the fourth hot water supply operation, the outlet temperature (To) is controlled to approach the first target temperature (To1) (the first temperature) described above.

The high-temperature water heated to the first target temperature (To1) by the water heat exchanger (13) is delivered to at least the bypass channel (61).

In the fourth hot water supply operation, the high-temperature layer (H) and the medium-temperature layer (M) are not formed in the tank (30). This prevents heated water from being delivered through the outflow pipe (42) to the first water supply channel (63). In the fourth hot water supply operation, only the high-temperature water flowing through the bypass channel (61) is supplied to the hot water supply target (T).

As illustrated in FIG. 10, in a case in which a portion of the high-temperature water heated by the water heat exchanger (13) is supplied to the bypass channel (61), the remaining portion of the high-temperature water is returned through the branch channel (62) and the first return pipe (45) to the upper storage portion (36) of the tank (30). Thus, the high-temperature water can be stored in the tank (30) while the high-temperature water is supplied to the hot water supply target (T).

On the other hand, in a case in which the entirety of the high-temperature water heated by the water heat exchanger (13) is supplied to the bypass channel (61), no high-temperature water is supplied to the upper storage portion (36). As can be seen, in the fourth hot water supply operation, a surplus of the high-temperature water heated by the water heat exchanger (13) and not flowing through the bypass channel (61) is returned to the tank (30).

In the first hot water storage operation described above, low-temperature water is heated to high-temperature water by the water heat exchanger (13). Adjusting the opening degree of the first mixing valve (53) and delivering the high-temperature water to the bypass channel (61) in the first hot water storage operation enable a shift from the first hot water storage operation to the fourth hot water supply operation. Thus, the first hot water storage operation can shift to the fourth hot water supply operation without significantly changing the flow of water through the hot water supply channel (40).

Advantages of Embodiment

This embodiment is directed to a hot water supply apparatus (20) including a hot water supply channel (40) including a water heat exchanger (13) configured to heat water and a tank (30) configured to store the water heated by the water heat exchanger (13), wherein the hot water supply channel (40) is configured to execute a first hot water supply operation in a fourth hot water storage state where a low-temperature layer (L), a medium-temperature layer (M), and a high-temperature layer (H) are formed in the tank (30), the first hot water supply operation being an operation of heating water in the medium-temperature layer (M) to a first temperature (a first target temperature (To1)) by the water heat exchanger (13) and supplying the water heated to a hot water supply target (T).

In the first hot water supply operation, the difference between the water temperatures at the inlet and outlet of the water heat exchanger (13) is relatively small. Thus, high-temperature water can be obtained without reducing the flow rate of water flowing through the water heat exchanger (13). This allows a sufficient amount of high-temperature water to be supplied to the hot water supply target (T). In other words, a sufficient amount of high-temperature water can be supplied to the hot water supply target (T) without increasing the capacity of the water heat exchanger (13) and without increasing the size of the water heat exchanger (13).

In the first hot water supply operation, medium-temperature water produced in the hot water storage operation is further heated to obtain high-temperature water. As described above, such two stage heating can increase the COP of the heat source apparatus (10) compared to the case of heating low-temperature water to high-temperature water. This can improve the energy conservation of the hot water supply apparatus (20).

In this embodiment, the first hot water supply operation includes an operation of supplying the water heated to the first temperature (first target temperature (To1)) by the water heat exchanger (13) to the hot water supply target (T) by bypassing the tank (30).

The high-temperature water heated by the water heat exchanger (13) and supplied to the tank (30) increases heat dissipation loss. Specifically, heat of the high-temperature water in the tank (30) is released to the outside of the tank (30), or heat of the high-temperature water is transferred to medium-temperature water or low-temperature water. In this embodiment, at least a portion of the high-temperature water heated by the water heat exchanger (13) bypasses the tank (30). This can reduce such heat dissipation loss.

In this embodiment, the first hot water supply operation includes an operation of supplying the water heated to the first temperature (first target temperature (To1)) by the water heat exchanger (13) to the hot water supply target (T) through the high-temperature layer (H) of the tank (30).

In this operation, the high-temperature water is returned to the tank (30), thereby making it possible to store the high-temperature water in the tank (30) simultaneously with the supply of the high-temperature water to the hot water supply target (T). In addition, in this operation, high-temperature water is preferentially passed through the bypass channel (61). If a surplus of high-temperature water is generated, the surplus of high-temperature water is delivered through the first return pipe (45) to the high-temperature layer (H) of the tank (30). This can minimize heat dissipation loss.

In this embodiment, the first hot water supply operation includes an operation of supplying water in the high-temperature layer (H) of the tank (30) to the hot water supply target (T) simultaneously with supplying at least a portion of the water heated by the water heat exchanger (13) to the hot water supply target (T) by bypassing the tank (30).

In this operation, high-temperature water flowing through the bypass channel (61) and high-temperature water flowing out of the tank (30) are mixed and then supplied to the hot water supply target (T). This allows a sufficient amount of high-temperature water to be supplied to the hot water supply target (T). In addition, since the high-temperature water in the tank (30) flows out of the tank (30), the heat dissipation loss of this high-temperature water can be reduced.

In this embodiment, the tank (30) includes an upper storage portion (36) corresponding to the high-temperature layer (H), a lower storage portion (34) corresponding to the low-temperature layer (L), and an intermediate storage portion (35) corresponding to the medium-temperature layer (M), and the hot water supply channel (40) includes: an inflow pipe (41) allowing a water source (S) and the lower storage portion (34) to communicate with each other; an outflow pipe (42) communicating with the upper storage portion (36); a first heating pipe (43) allowing the intermediate storage portion (35) and an inlet side of the water heat exchanger (13) to communicate with each other; a bypass channel (61) allowing an outlet side of the water heat exchanger (13) and an outlet end of the outflow pipe (42) to communicate with each other; a first return pipe (45) allowing the outlet side of the water heat exchanger (13) and the upper storage portion (36) to communicate with each other; and a first mixing valve (53) configured to adjust at least flow rates in the outflow pipe (42) and the bypass channel (61).

This configuration enables the first hot water supply operation. In the first hot water supply operation, adjustment of the first mixing valve (53) enables adjustment of the flow rate of water through the bypass channel (61) and the flow rate of water through the outflow pipe (42). The outlet end of the bypass channel (61) can be opened and closed, and the outlet end of the outflow pipe (42) can be opened and closed. Adjusting the flow rate of water through the bypass channel (61) enables indirect adjustment of the flow rate of water through the first return pipe (45). Adjusting the flow rate of water through the bypass channel (61) enables indirect adjustment of the flow rate of water flowing through the water heat exchanger (13). Adjusting the flow rate of water flowing through the water heat exchanger (13) enables adjustment of the temperature of water flowing out of the water heat exchanger (13) (the outlet temperature (To)).

In this embodiment, the hot water supply channel (40) includes: a second return pipe (46) allowing the outlet side of the water heat exchanger (13) and the intermediate storage portion (35) to communicate with each other; a second heating pipe (44) allowing the lower storage portion (34) and an inlet side of the water heat exchanger (13) to communicate with each other; a first three-way valve (51) configured to alternately change connection of the inlet side of the water heat exchanger (13) with the first heating pipe (43) or the second heating pipe (44); and a second three-way valve (52) configured to alternately change connection of the outlet side of the water heat exchanger (13) with the first return pipe (45) or the second return pipe (46).

This configuration enables switching among the first, second, third, and fourth hot water supply operations described above, and enables switching among the first, second, and third hot water storage operations described above.

In this embodiment, the hot water supply channel (40) is configured to execute a second hot water supply operation of supplying water in the high-temperature layer (H) of the tank (30) to the hot water supply target (T) simultaneously with supplying water in the medium-temperature layer (M) of the intermediate storage portion (35) to the hot water supply target (T) through the second return pipe (46) and the bypass channel (61).

In the second hot water supply operation, medium-temperature water can be supplied to the hot water supply target (T) while the heat source apparatus (10) is stopped. In the second hot water supply operation, as illustrated in FIG. 8, medium-temperature water is supplied through the second return pipe (46) and the bypass channel (61) to the hot water supply target (T). In the second hot water storage operation and the third hot water supply operation, the second return pipe (46) serves also as a channel for delivering medium-temperature water from the heating section (13) to the tank (30). This can reduce the number of pipes of the hot water supply channel (40).

In this embodiment, the hot water supply channel (40) is configured to execute a third hot water supply operation of supplying water in the high-temperature layer (H) of the tank (30) to the hot water supply target (T) simultaneously with heating water in the low-temperature layer (L) of the second storage portion (34) to a second temperature lower than the first temperature by the heating section (13) and supplying the water heated to the hot water supply target (T).

In the third hot water supply operation, medium-temperature water can be supplied to the hot water supply target (T) while the tank (30) is in the second hot water storage state or the fourth hot water storage state. The COP of the heat source apparatus (10) can be increased as described above in a case of heating low-temperature water to medium-temperature water by the heating section (13).

In this embodiment, the third hot water supply operation includes an operation of returning a portion of the water heated by the heating section (13) to the medium-temperature layer (M) of the intermediate storage portion (35).

In this operation, medium-temperature water can be stored in the tank (30) while being supplied to the hot water supply target (T).

In this embodiment, the hot water supply apparatus includes a demand determination section (29) configured to determine which of the first hot water supply operation or the third hot water supply operation is to be executed, based on a necessary quantity of heat for the hot water supply target (T) and a quantity of heat stored in the tank (30).

Specifically, the first hot water supply operation is executed when the demand determination section (29) determines that the quantity of heat stored (Qa) is smaller than the necessary quantity of heat (Qd). In the first hot water supply operation, medium-temperature water is heated to high-temperature water by the heating section (13). Thus, even if the quantity of heat stored (Qa) in the tank (30) is insufficient, a sufficient amount of high-temperature water can be supplied to the hot water supply target (T).

The third hot water supply operation is executed when the demand determination section (29) determines that the quantity of heat stored (Qa) is larger than or equal to the necessary quantity of heat (Qd). Thus, an operation with a high COP can be performed while the demand from the hot water supply target (T) is satisfied.

In this embodiment, the hot water supply channel (40) is configured to execute a fourth hot water supply operation of heating water in the low-temperature layer (L) of the second storage portion (34) to the first temperature by the heating section (13) and supplying the water heated to the hot water supply target (T).

In the fourth hot water supply operation, high-temperature water can be supplied to the hot water supply target (T) while no high-temperature water is in the tank (30).

Variation of Embodiment

Figure 11:
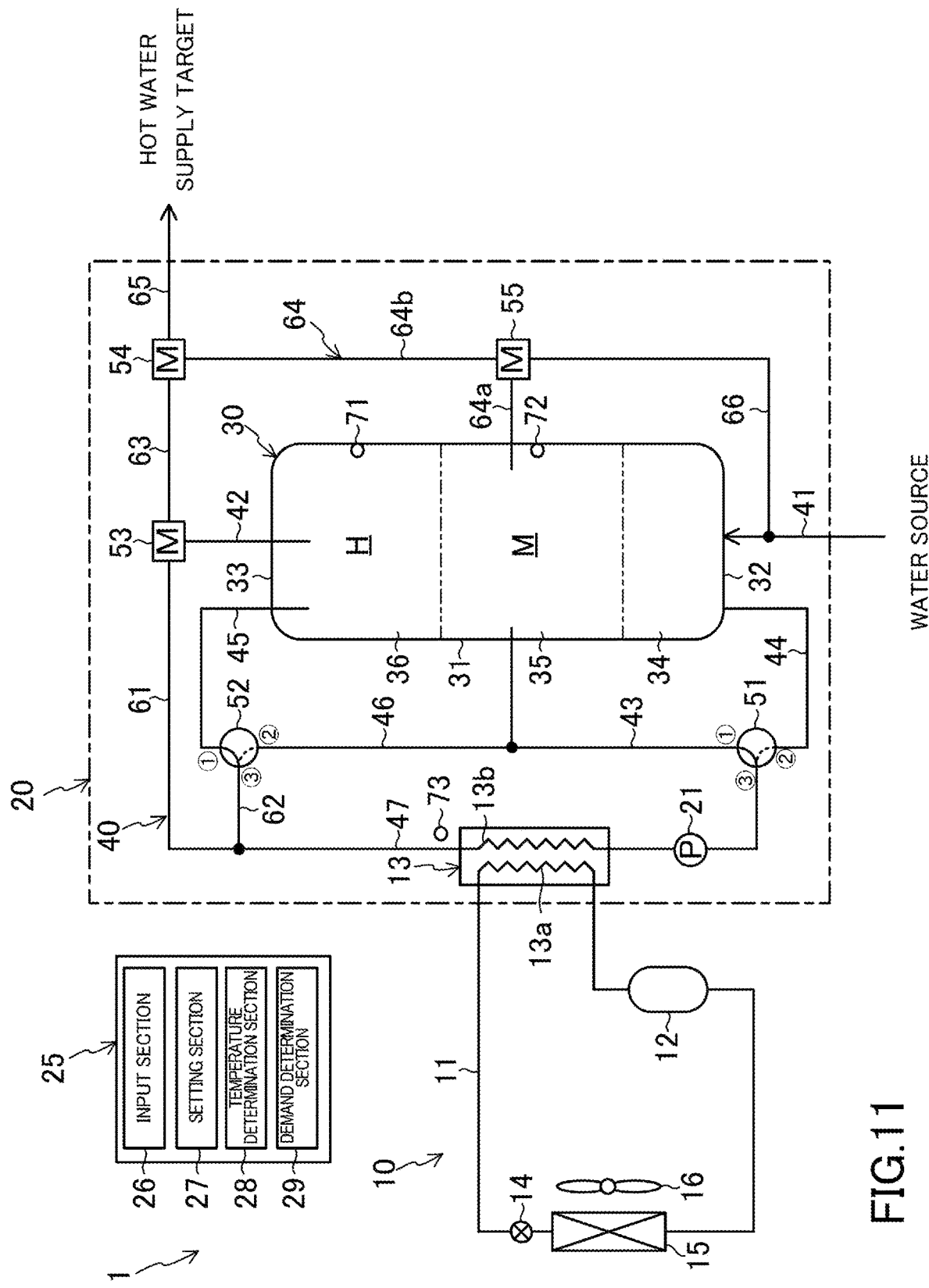
FIG. 11 is a piping system diagram illustrating an overall configuration of a hot water supply unit according to a variation.

In a variation shown in FIG. 11, the hot water supply channel (40) of the foregoing embodiment further includes a third water supply channel (66) and a third mixing valve (55).

The second water supply channel (64) allows the intermediate storage portion (35) of the tank (30) and the inlet end of the main water supply channel (65) to communicate with each other. One end of the second water supply channel (64) is connected to the intermediate storage portion (35) of the tank (30). The other end of the second water supply channel (64) is connected to the second mixing valve (54). The second water supply channel (64) is comprised of a tank-side water supply channel (64a) on the upstream side, and a hot water supply-side water supply channel (64b) on the downstream side. The outlet end of the tank-side water supply channel (64a) and the inlet end of the hot water supply-side water supply channel (64b) are connected to the third mixing valve (55).

The third water supply channel (66) allows the inflow pipe (41) and the second water supply channel (64) to communicate with each other. The outlet end of the third water supply channel (66) is connected to the third mixing valve (55).

In this variation, the second mixing valve (54) corresponds to a second adjusting mechanism. The second mixing valve (54) adjusts both the flow rate of the first water supply channel (63) and the flow rate of the second water supply channel (64). The second mixing valve (54) may be configured to adjust only the flow rate of the second water supply channel (64).

The third mixing valve (55) corresponds to a third adjusting mechanism. The third mixing valve (55) adjusts both the flow rate of the second water supply channel (64) and the flow rate of the third water supply channel (66). The third mixing valve (55) may be configured to adjust only the flow rate of the third water supply channel (66). The third mixing valve (55) opens and closes the outlet end of the tank-side water supply channel (64a) and the outlet end of the third water supply channel (66).

Hot Water Supply Operation

A hot water supply operation of the variation is basically the same as that of the foregoing embodiment. In each of first, second, and third hot water supply operations of the variation, medium-temperature water in the medium-temperature layer (M) of the intermediate storage portion (35) of the tank (30) can be supplied through the second water supply channel (64) to the hot water supply target (T). In this supply of the medium-temperature water, low-temperature water of the water source (S) can be supplied through the third water supply channel (66) to the second water supply channel (64). In this case, the medium-temperature water and the low-temperature water are mixed in the third mixing valve (55).

In the first hot water supply operation shown in FIG. 12, the medium-temperature water in the medium-temperature layer (M) is heated to high-temperature water by the water heat exchanger (13). Thus, in the first hot water supply operation (see FIG. 7) of the foregoing embodiment, the medium-temperature water cannot be supplied directly to the hot water supply target (T). On the other hand, in the first hot water supply operation of the variation, medium-temperature water can be supplied through the second water supply channel (64) to the hot water supply target (T) while the medium-temperature water in the medium-temperature layer (M) is heated to high-temperature water by the water heat exchanger (13). In the variation, adjusting the opening degrees of the second and third mixing valves (54) and (55) substantially enables adjustment of the mixing ratio among high-temperature water, medium-temperature water, and low-temperature water. The temperature of water to be supplied to the hot water supply target (T) can thus be finely adjusted.

Other Embodiments

The embodiment and variation described above may be implemented as follows.

The tank (30) may be provided with three or more temperature sensors. The state of hot water stored in the tank (30) may be determined based on the difference between the detection values of the temperature sensors.

At least one of the first adjusting mechanism (53), the second adjusting mechanism (54), or the third adjusting mechanism (55) may be other than a mixing valve. Instead of these adjusting mechanisms (53, 54, 55), a flow rate control valve, an electromagnetic on-off valve, a three-way valve, and other components may be combined.

The hot water supply apparatus (20) may be configured such that the hot water supply apparatus (20) executes at least the first hot water supply operation, among the first hot water supply operation, the second hot water supply operation, the third hot water supply operation, and the fourth hot water supply operation. In a case in which the hot water supply apparatus (20) is configured to execute only the first hot water supply operation and the third hot water supply operation among the foregoing hot water supply operations, it is preferable to provide a determination section (29) configured to determine which of the first or third hot water supply operation is to be performed, based on the necessary quantity of heat for the hot water supply target (T) and the quantity of heat stored in the tank (30). In a case in which the hot water supply apparatus (20) is configured to execute only the first hot water supply operation, the second hot water supply operation, and the third hot water supply operation among the foregoing hot water supply operations, it is preferable to provide a determination section (29) configured to determine which of the first, second, or third hot water supply operation is to be performed, based on the necessary quantity of heat for the hot water supply target (T) and the quantity of heat stored in the tank (30).

The heating section for heating water may be another means such as a heater. The heat source apparatus (10) may perform a supercritical cycle in which the high pressure of $CO_2$ used as a refrigerant is higher than or equal to the critical pressure thereof.

While the embodiment and variation thereof have been described above, it will be understood that various changes in form and details may be made without departing from the spirit and scope of the claims. The embodiment, the variation thereof, and the other embodiments may be combined and replaced with each other without deteriorating intended functions of the present disclosure. The expressions of "first," "second," and "third" described above are used to distinguish the terms to which these expressions are given, and do not limit the number and order of the terms.

The present disclosure is useful for a hot water supply apparatus.

The invention claimed is:

1. A hot water supply apparatus comprising:
a hot water supply channel including
a heating section configured to heat water and
a tank configured to store the water heated by the heating section,
the hot water supply channel being configured to execute a first hot water supply operation in a hot water storage state in which a low-temperature layer, a medium-temperature layer, and a high-temperature layer are formed in the tank, and
the first hot water supply operation including
heating water in the medium-temperature layer to a first temperature by the heating section, and
supplying to a hot water supply target by bypassing the tank,
the tank including a first storage portion corresponding to the high-temperature layer, a second storage portion corresponding to the low-temperature layer, and an intermediate storage portion corresponding to the medium-temperature layer,
the hot water supply channel including
an inflow channel allowing a water source and the second storage portion to communicate with each other;
an outflow channel communicating with the first storage portion;
a first heating channel allowing the intermediate storage portion and an inlet side of the heating section to communicate with each other;
a bypass channel allowing an outlet side of the heating section and an outlet end of the outflow channel to communicate with each other;
a first return channel allowing the outlet side of the heating section and the first storage portion to communicate with each other;
a second return channel allowing the outlet side of the heating section and the intermediate storage portion to communicate with each other; and
a first adjusting mechanism configured to adjust at least flow rates in the outflow channel and the bypass channel,
the hot water supply channel being configured to execute a second hot water supply operation of supplying water in the high-temperature layer of the tank to the hot water supply target simultaneously with supplying water in the medium-temperature layer of the intermediate storage portion to the hot water supply target through the second return channel and the bypass channel.

2. The hot water supply apparatus according to claim 1, wherein
the hot water supply channel further includes
a second heating channel allowing the second storage portion and the inlet side of the heating section to communicate with each other,
a first switching mechanism configured to alternately change connection of the inlet side of the heating section with the first heating channel or the second heating channel, and
a second switching mechanism configured to alternately change connection of the outlet side of the heating section with the first return channel or the second return channel.

3. The hot water supply apparatus according to claim 2, wherein
the hot water supply channel is configured to execute a third hot water supply operation of supplying water in the high-temperature layer of the tank to the hot water supply target simultaneously with heating water in the low-temperature layer of the second storage portion to a second temperature lower than the first temperature by the heating section and supplying the water heated to the hot water supply target.

4. The hot water supply apparatus according to claim 3, wherein
the third hot water supply operation includes returning a portion of the water heated by the heating section to the medium-temperature layer of the intermediate storage portion.

5. The hot water supply apparatus according to claim 3, further comprising:
a determination section configured to determine which of the first hot water supply operation or the third hot water supply operation is to be executed, based on a necessary quantity of heat for the hot water supply target and a quantity of heat stored in the tank.

6. The hot water supply apparatus according to claim 5, wherein
the determination section is configured to determine which of the first hot water supply operation, the second hot water supply operation, or the third hot water supply operation is to be executed, based on the necessary quantity of heat for the hot water supply target and the quantity of heat stored in the tank.

7. The hot water supply apparatus according to claim 1, wherein
the hot water supply channel is configured to execute a fourth hot water supply operation of heating water in the low-temperature layer of the second storage portion to the first temperature by the heating section and supplying the water heated to the hot water supply target.

8. The hot water supply apparatus according to claim 7, further comprising:
a controller configured to cause execution of the fourth hot water supply operation when there is a demand from the hot water supply target while water in the high-temperature layer of the tank and water in the medium-temperature layer are insufficient.

9. The hot water supply apparatus according to claim 1, wherein
the hot water supply channel further includes
a first water supply channel communicating with the outlet end of the outflow channel,
a main water supply channel allowing the first water supply channel and the hot water supply target to communicate with each other,
a second water supply channel allowing the intermediate storage portion and an inlet end of the main water supply channel to communicate with each other, and
a second adjusting mechanism configured to adjust, of a flow rate in the first water supply channel and a flow rate in the second water supply channel, at least the flow rate in the second water supply channel.

10. The hot water supply apparatus according to claim 9, wherein the hot water supply channel further includes
a third water supply channel allowing the inflow channel and the second water supply channel to communicate with each other, and
a third adjusting mechanism configured to adjust, of the flow rate in the second water supply channel and a flow rate in the third water supply channel, at least the flow rate in the third water supply channel.

11. A hot water supply apparatus comprising:
a hot water supply channel including
a heating section configured to heat water and
a tank configured to store the water heated by the heating section,
the tank includes
a first storage portion corresponding to a high-temperature layer,
a second storage portion corresponding to a low-temperature layer, and
an intermediate storage portion corresponding to the medium-temperature layer, and
the hot water supply channel including
an inflow channel allowing a water source and the second storage portion to communicate with each other,
an outflow channel communicating with the first storage portion,
a first heating channel allowing the intermediate storage portion and an inlet side of the heating section to communicate with each other,
a bypass channel allowing an outlet side of the heating section and an outlet end of the outflow channel to communicate with each other,
a first return channel allowing the outlet side of the heating section and the first storage portion to communicate with each other,
an adjusting mechanism configured to adjust at least flow rates in the outflow channel and the bypass channel,
a second return channel allowing the outlet side of the heating section and the intermediate storage portion to communicate with each other,
a second heating channel allowing the second storage portion and the inlet side of the heating section to communicate with each other,
a first switching mechanism configured to alternately change connection of the inlet side of the heating section with the first heating channel or the second heating channel, and
a second switching mechanism configured to alternately change connection of the outlet side of the heating section with the first return channel or the second return channel,
the hot water supply channel being configured to execute a first hot water supply operation in a hot water storage state in which the low-temperature layer, the medium-temperature layer, and the high-temperature layer are formed in the tank, the first hot water supply operation including
heating water in the medium-temperature layer to a first temperature by the heating section, and
supplying the water heated to a hot water supply target, and the hot water supply channel being configured to execute a second hot water supply operation of supplying water in the high-temperature layer of the tank to the hot water supply target simultaneously with supplying water in the medium-temperature layer of the intermediate storage portion to the hot water supply target through the second return channel and the bypass channel.

12. A hot water supply apparatus comprising:
a hot water supply channel including
a heating section configured to heat water and
a tank configured to store the water heated by the heating section,
the tank including
a first storage portion corresponding to a high-temperature layer,
a second storage portion corresponding to a low-temperature layer, and
an intermediate storage portion corresponding to the medium-temperature layer, and
the hot water supply channel including
an inflow channel allowing a water source and the second storage portion to communicate with each other,
an outflow channel communicating with the first storage portion,
a first heating channel allowing the intermediate storage portion and an inlet side of the heating section to communicate with each other,
a bypass channel allowing an outlet side of the heating section and an outlet end of the outflow channel to communicate with each other,
a first return channel allowing the outlet side of the heating section and the first storage portion to communicate with each other,
an adjusting mechanism configured to adjust at least flow rates in the outflow channel and the bypass channel,
a second return channel allowing the outlet side of the heating section and the intermediate storage portion to communicate with each other,
a second heating channel allowing the second storage portion and the inlet side of the heating section to communicate with each other,
a first switching mechanism configured to alternately change connection of the inlet side of the heating section with the first heating channel or the second heating channel, and
a second switching mechanism configured to alternately change connection of the outlet side of the heating section with the first return channel or the second return channel, the hot water supply channel being configured to execute a first hot water supply operation in a hot water storage state in which the low-temperature layer, the medium-temperature layer, and the high-temperature layer are formed in the tank, the first hot water supply operation including
heating water in the medium-temperature layer to a first temperature by the heating section, and
supplying the water heated to a hot water supply target, the hot water supply channel being configured to execute a second hot water supply operation of supplying water in the high-temperature layer of the tank to the hot water supply target simultaneously with supplying water in the medium-temperature layer of the intermediate storage portion to the hot water supply target through the second return channel and the bypass channel, the hot water supply channel being configured to execute a third hot water supply operation of supplying water in the high-temperature layer of the tank to the hot water supply target simultaneously with heating water in the low-temperature layer of the second storage portion to a second temperature lower than the first temperature by the heating section and supplying the water heated to the hot water supply target, a determination section configured to determine which of the first hot water supply operation, the second hot water supply operation, or the third hot water supply operation is to be executed, based on a necessary quantity of heat for the hot water supply target and a quantity of heat stored in the tank.

13. The hot water supply apparatus of claim 1, wherein the first hot water supply operation includes an operation of supplying the water heated to the first temperature by the heating section to the hot water supply target through the high-temperature layer of the tank.

14. The hot water supply apparatus of claim 1, wherein the first hot water supply operation includes an operation of supplying water in the high-temperature layer of the tank to the hot water supply target simultaneously with supplying at least a portion of the water heated by the heating section to the hot water supply target by bypassing the tank.

* * * * *